United States Patent [19]
Renn

[11] Patent Number: 6,068,543
[45] Date of Patent: May 30, 2000

[54] MINIATURE ALL-PURPOSE TOOL

[76] Inventor: Robert Maurice Renn, 1901 Turfwood Dr., Pfafftown, N.C. 27040

[21] Appl. No.: 08/799,618

[22] Filed: Feb. 12, 1997

Related U.S. Application Data

[60] Provisional application No. 60/011,547, Feb. 13, 1996.
[51] Int. Cl.[7] .................................................. B24B 7/00
[52] U.S. Cl. .......................... 451/67; 451/231; 451/278; 451/411
[58] Field of Search .................................. 451/65, 67, 69, 451/71, 127, 215, 231, 236, 278, 280, 411

[56] References Cited

U.S. PATENT DOCUMENTS

| | | | |
|---|---|---|---|
| 1,144,591 | 2/1923 | Daly ...................................... | 451/411 X |
| 1,758,534 | 5/1930 | Porter ...................................... | 451/215 |
| 2,933,022 | 4/1960 | Stark ...................................... | 451/411 X |
| 3,124,018 | 3/1964 | Gough ...................................... | 451/411 X |
| 3,572,680 | 3/1971 | Neff ...................................... | 451/411 X |
| 4,262,453 | 4/1981 | Parigot et al. ...................... | 451/411 X |
| 4,597,226 | 7/1986 | Jewett, Sr. ........................... | 451/215 X |
| 4,735,019 | 4/1988 | Wiederkehr ......................... | 451/215 X |
| 5,738,564 | 4/1998 | Helle et al. .......................... | 451/215 X |

*Primary Examiner*—Timothy V. Eley

[57] ABSTRACT

A machine is provided to make possible many precision operations on wood and some metals on a miniature scale for miniaturists, modelers and hobbyists. Said machine, as seen in FIG. 25 comprises a base,200, an x-y table,212,224, a y only table,212, a stationary table,212 (when locked) an elevator 225 or z axis mechanism and a modular over-arm assembly 250 for accurately positioning and holding standard hand tools such as a hand drill, hand grinder, moto-tool, flexible shaft type tools and heat gun to perform operations otherwise impossible with such tools.

18 Claims, 26 Drawing Sheets

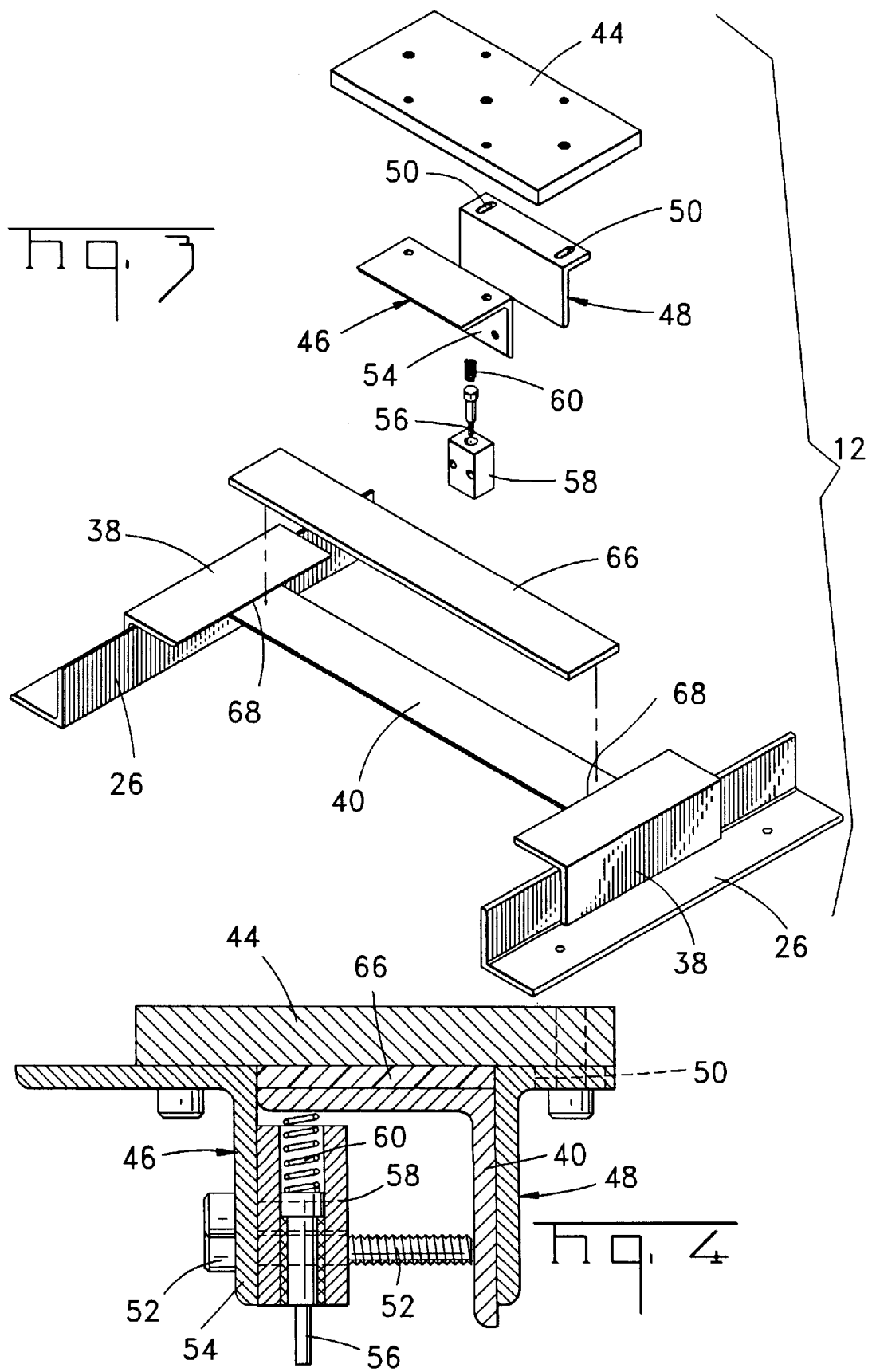

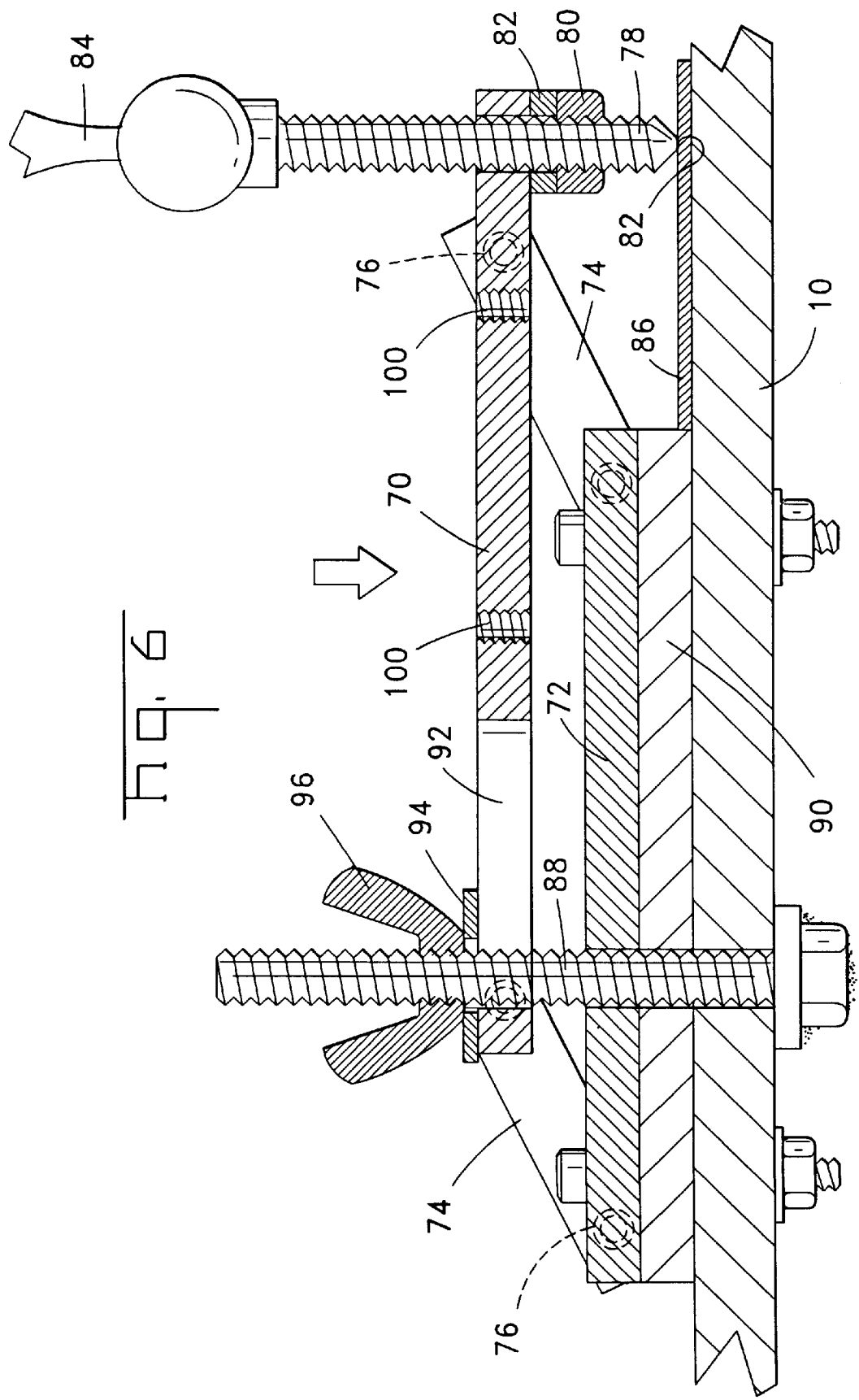

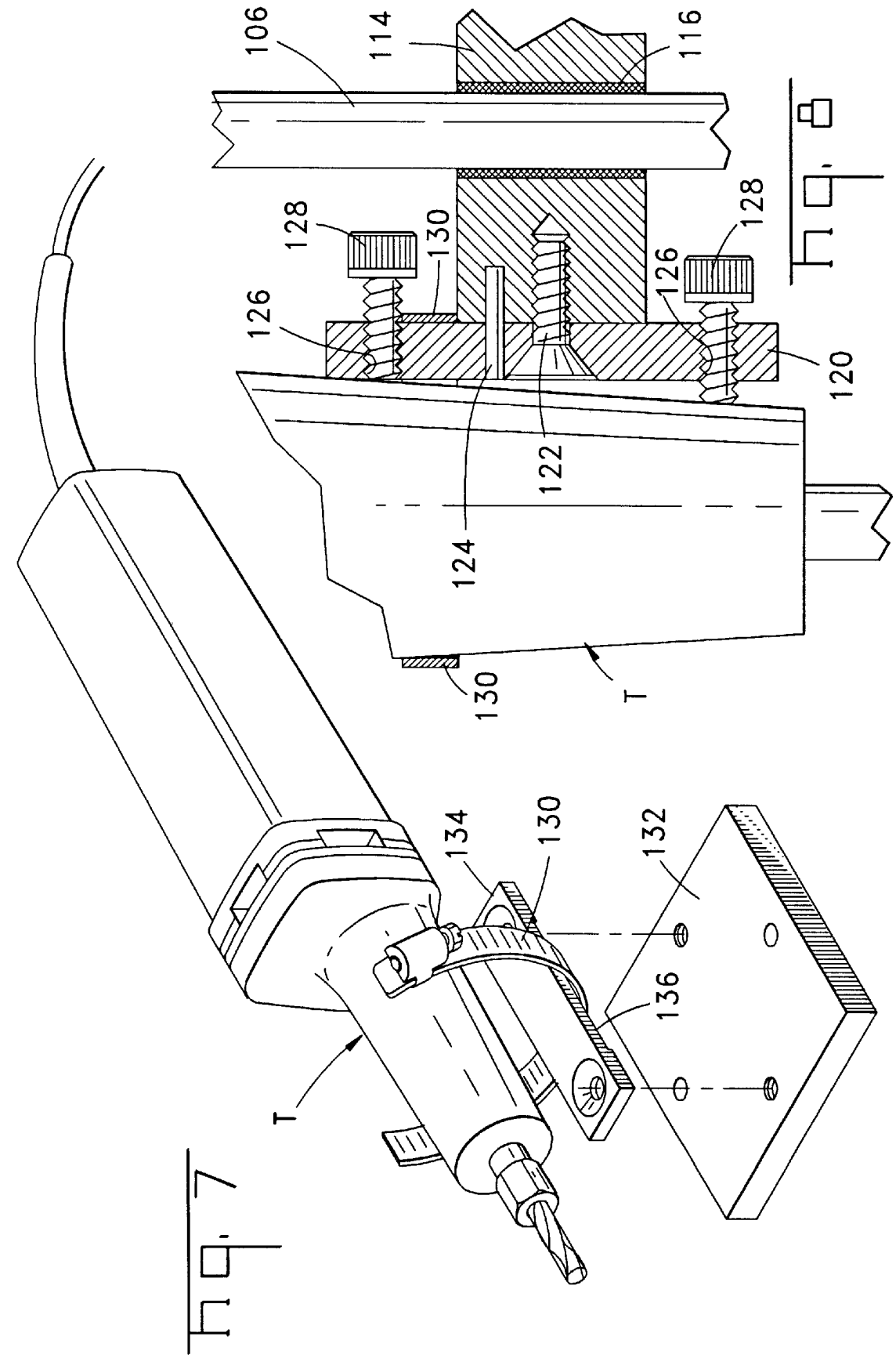

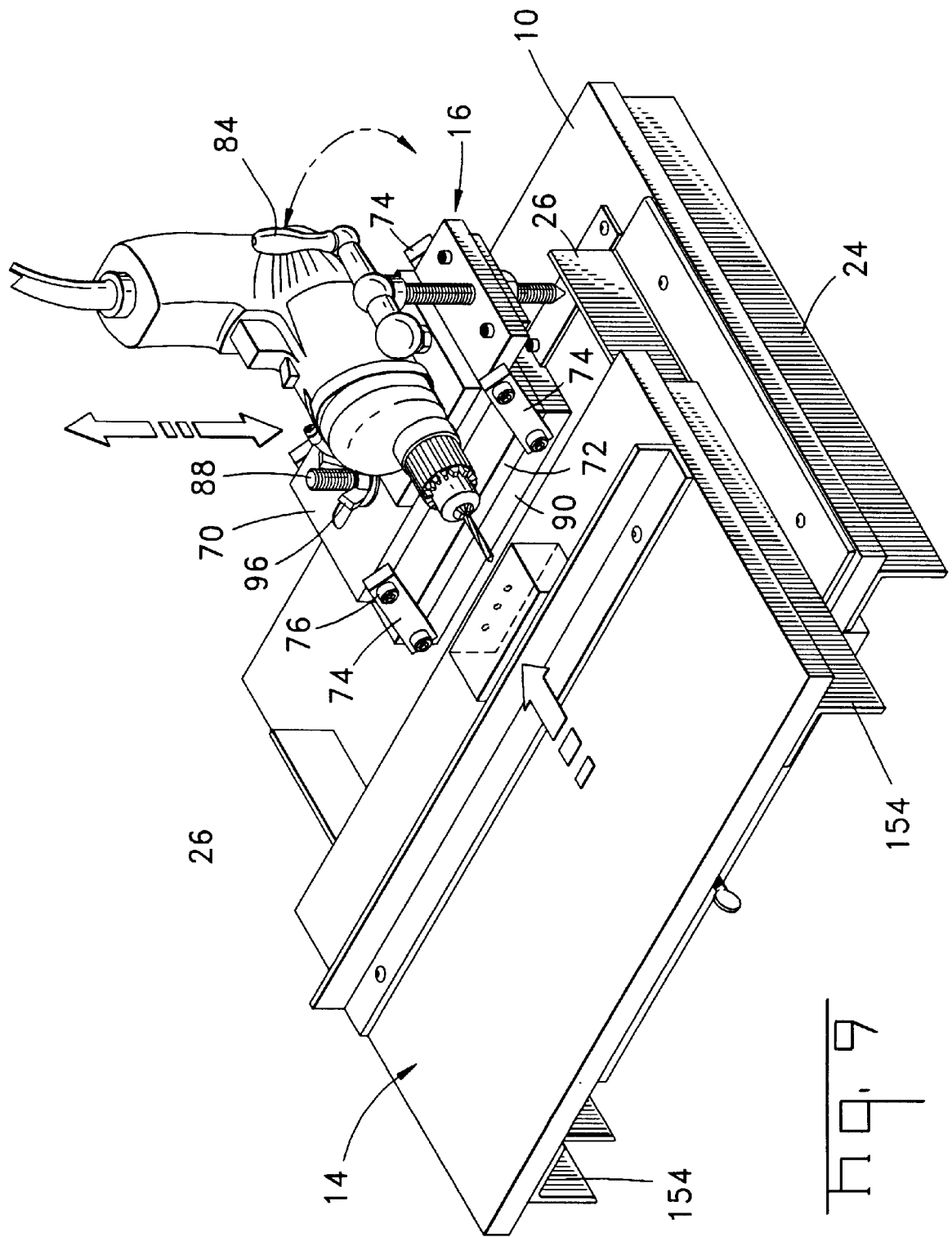

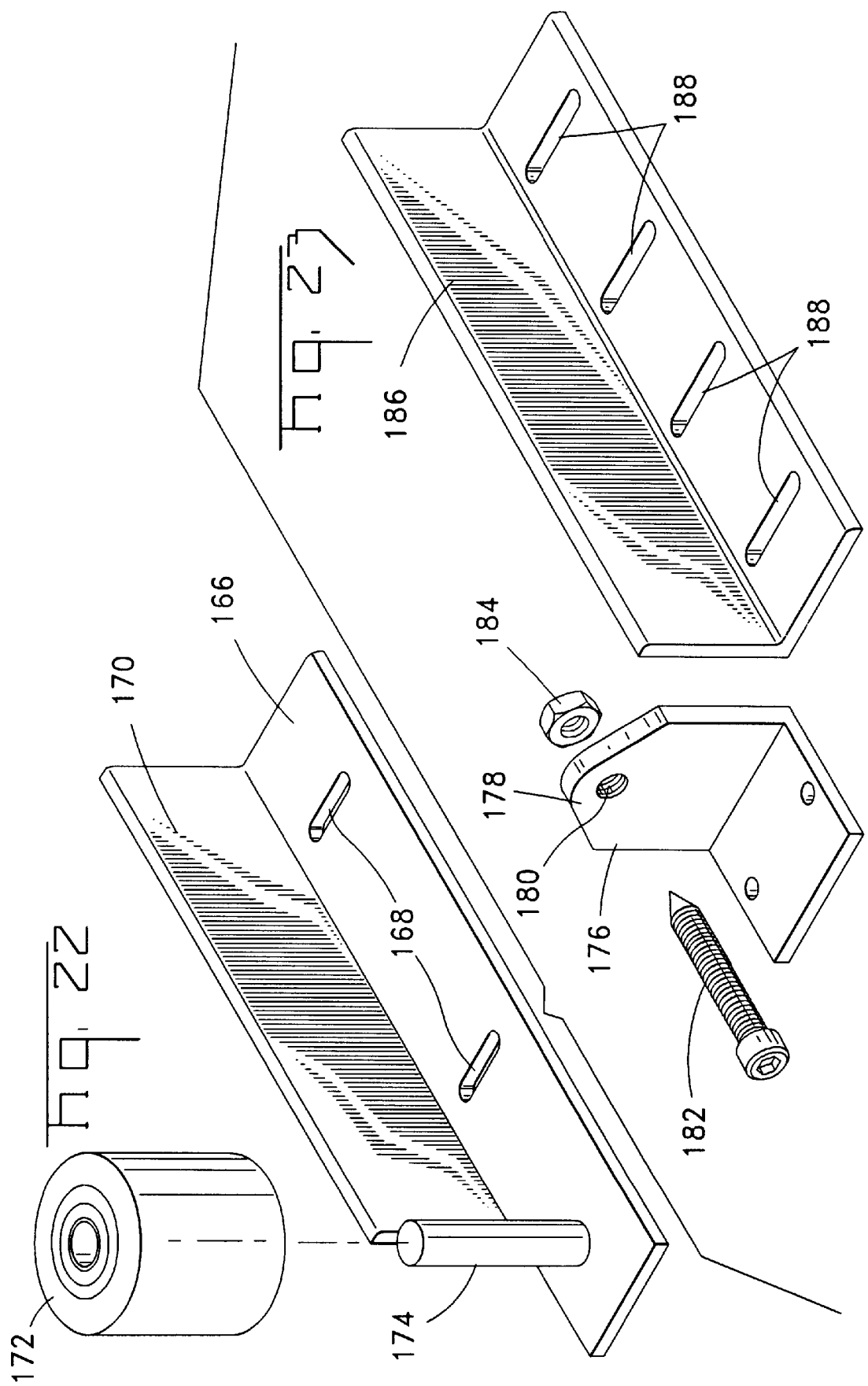

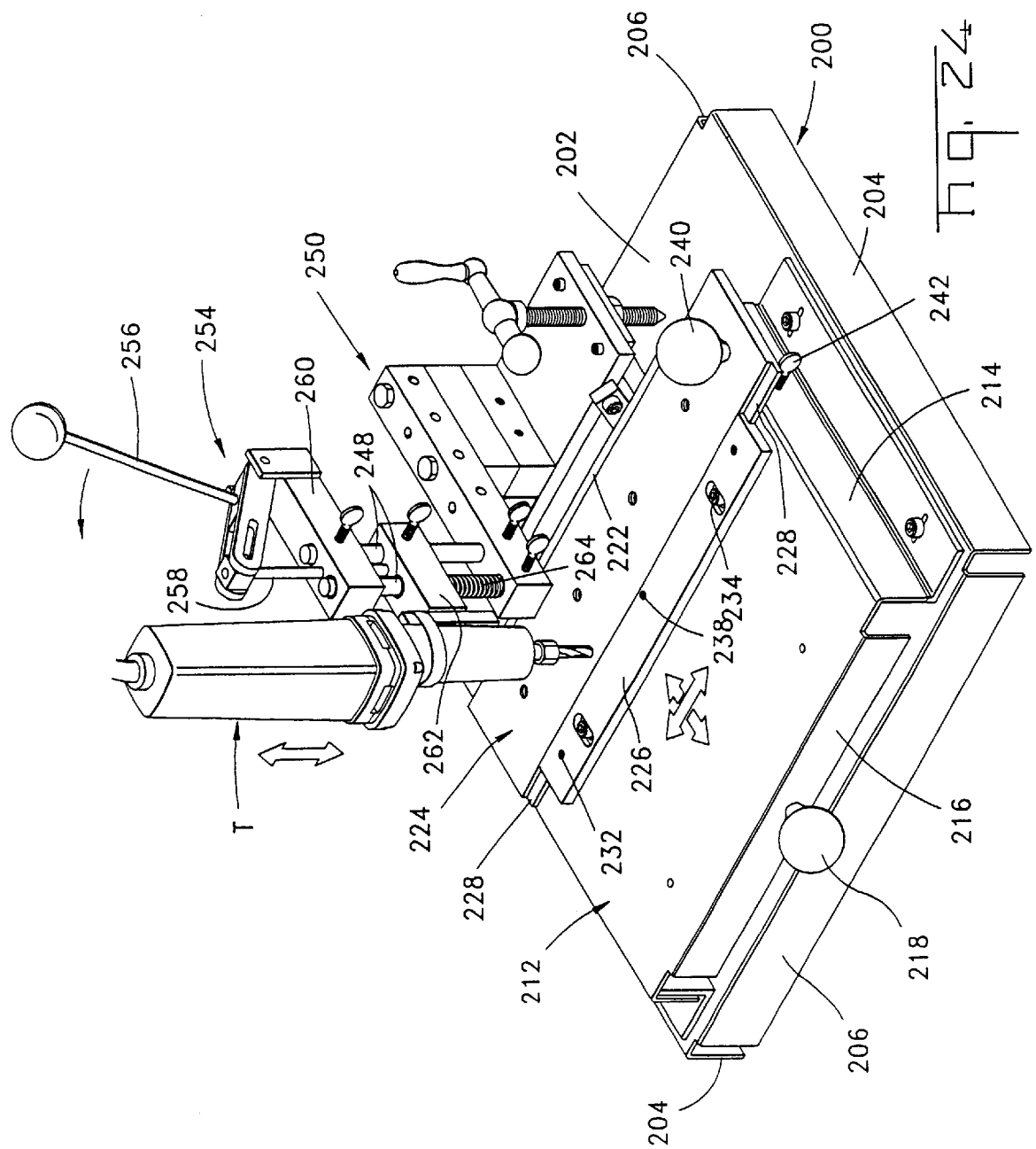

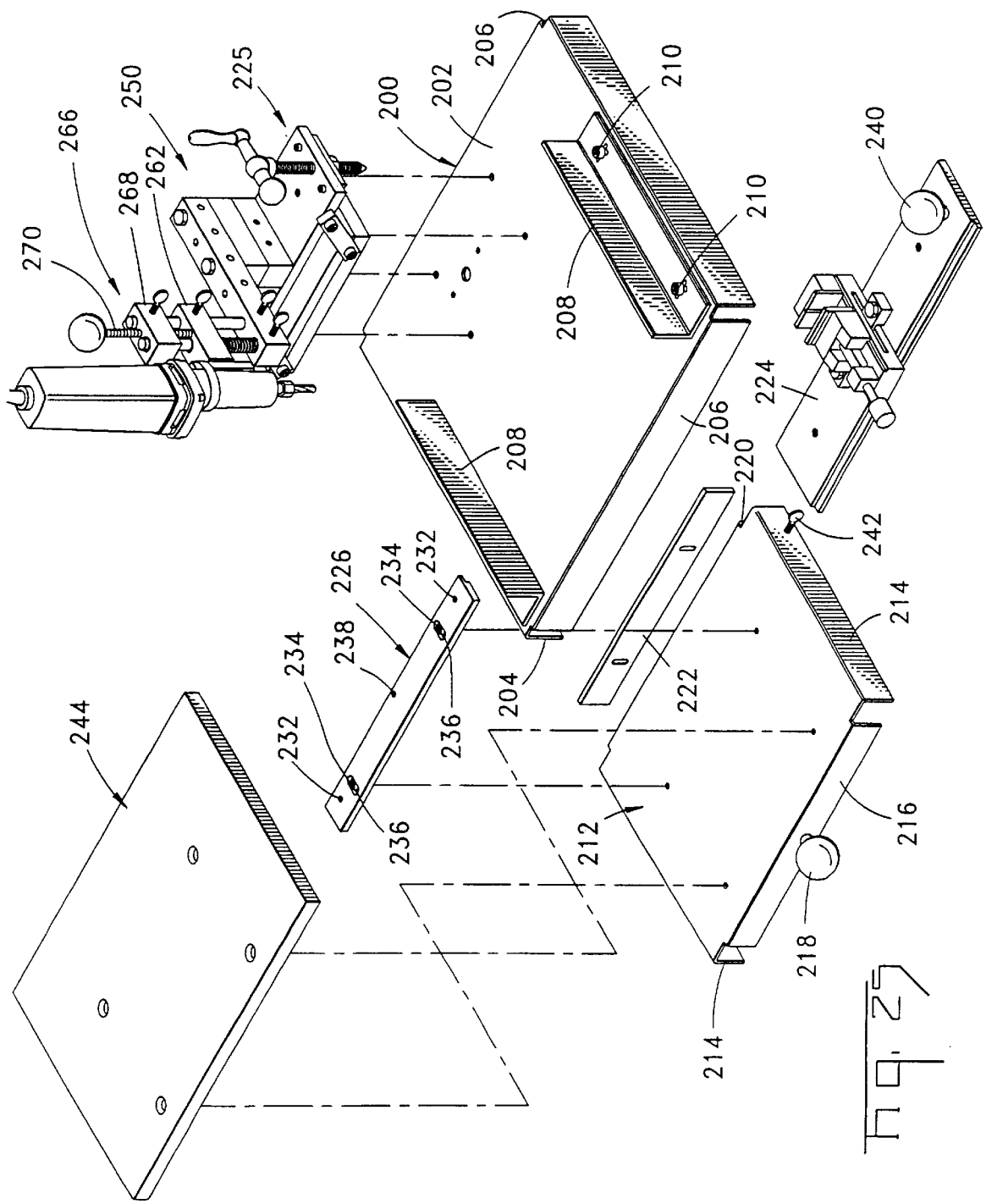

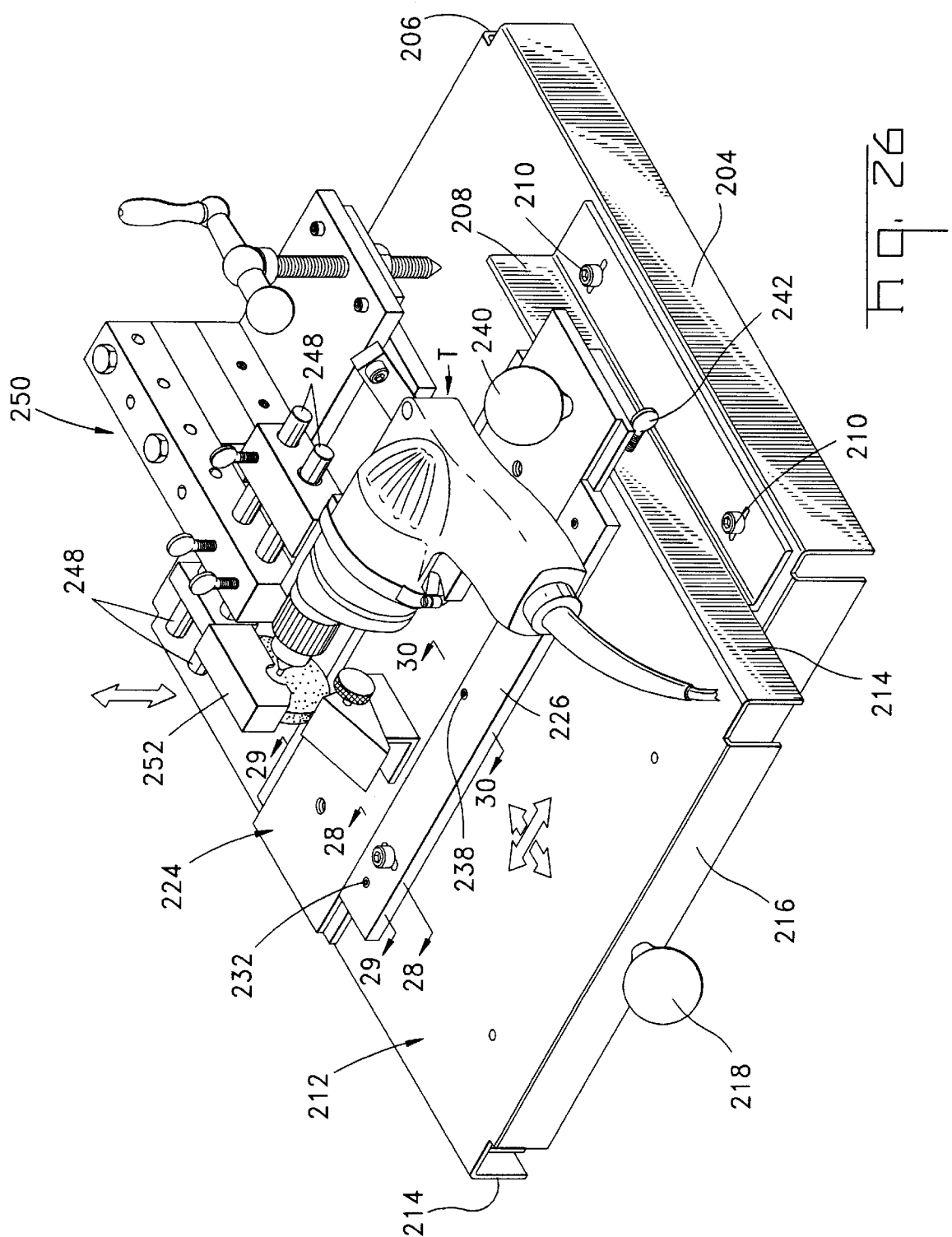

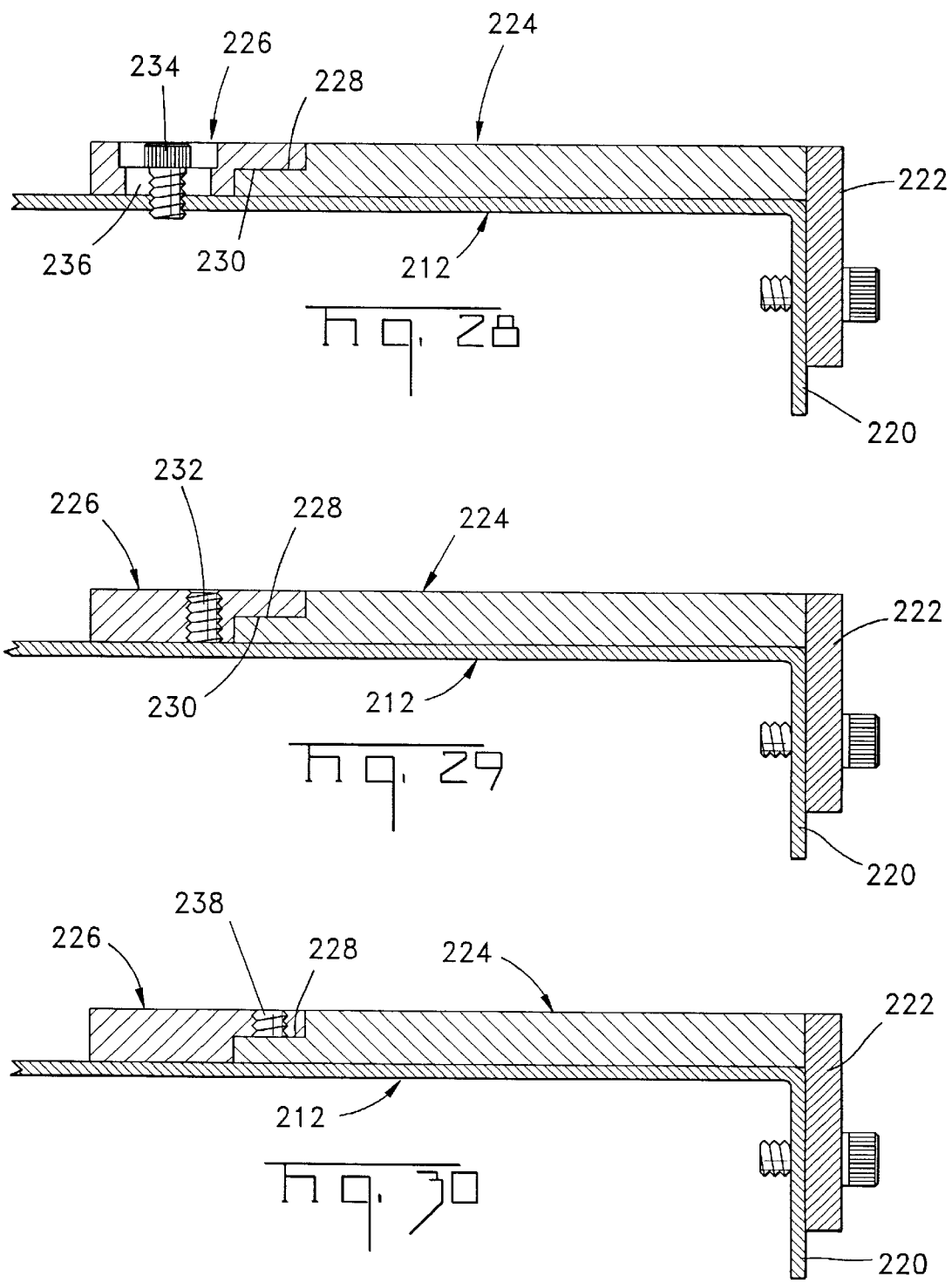

MINIATURE ALL-PURPOSE TOOL

CROSS REFERENCE TO PRIOR APPLICATIONS

Priority is hereby claimed from prior co-pending provisional patent application, Ser. No. 60/011,547 filed Feb. 13, 1996 entitled "Miniature All-Purpose Tool".

BACKGROUND OF THE INVENTION

Many people would like to create and make things of wood and metal but do not have the financial means to purchase the necessary machines or a place to keep them. This is especially true of young people just starting out and of many retired people who live in mobile homes and apartments. The present invention would give these people the opportunity to do shop work on a smaller size level with only a few simple hand tools such as a hand drill, hand grinder, moto tool, heat gun and etc. When used with the disclosed invention, these simple tools can perform the same shop tasks as machines which cost thousands of dollars and consume vast amounts of space, and yet it can be stored in a closet or under a bed and can be used on the kitchen table or on a picnic table or the like.

Changes can be made from one type of machine to another in minutes. It can be a milling machine, drill press, surface grinder, cylindrical grinder, thickness planer, pin router, over-arm router, shaper, horizontal boring machine, disk sander, drum sander, belt sander, lathe, tapping guide, scroll saw, die filer, vacuum former, plastic heat shaping tool and more. The machine will hold a great variety of hand tools in any of many positions and provides X-Y-Z motion of the work-piece relative to the tool, but is still an inexpensive machine costing a small fraction of many of the above mentioned machines.

Most home wood shops include a table saw, radial-arm saw, drill press, jointer, band saw, jig saw, shaper, and planer. This machine would also be an asset to such a shop because it would do, on a small scale, operations needing expensive tools not usually found in home workshops, such as a pin router which costs about $3,000, or a milling machine, surface grinder, or cylindrical grinder which costs thousands of dollars each The machine would also be useful to people who work on miniature things like model railroads, doll houses, and the like. Many of these people use xacto knives, pocket knives and sanding sticks to laboriously achieve their end results which could be done quickly, accurately, and repeatedly with the disclosed machine. It provides a means of performing tasks not otherwise possible without a shop full of expensive tools.

SUMMARY OF THE INVENTION

A machine is provided to make possible many precision operations on wood and some metals on a miniature scale for miniaturists, modelers and hobbyists. Said machine, as seen in FIG. 25 comprises a base, 200, an x-y table, 212, 224, a y only table, 212, a stationary table, 212 (when locked) an elevator 225 or z axis mechanism and a modular over-arm assembly 250 for accurately positioning and holding standard hand tools such as a hand drill, hand grinder, moto-tool, flexible shaft type tools and heat gun to perform operations otherwise impossible with such tools.

OBJECTS OF THE INVENTION

It is an object of this invention to provide a machine which, when used with a common hand drill or hand grinder, becomes a large variety of precision bench mounted tools to be used by miniaturists, modelers and the like to perform many operations otherwise impossible for them without the purchase of many high priced machines.

It is a further object of this invention to provide an inexpensive X-Y table mechanism which can easily be removed in seconds from the machine to allow the use of other tables such as a Y—only moving table or a stationary table to accommodate the varying uses of this machine.

It is a still further object of this invention to provide a simple and inexpensive mechanism for motion in the Z axis to raise and lower tooling.

It is a yet further object of this invention to provide a modular over-arm assembly with tool holding and positioning means.

It is a still further object of this invention to provide a machine which, in seconds, can be changed to a completely different machine.

DETAILED DESCRIPTION OF THE PREFERRED EMBODIMENT

Figure 2:
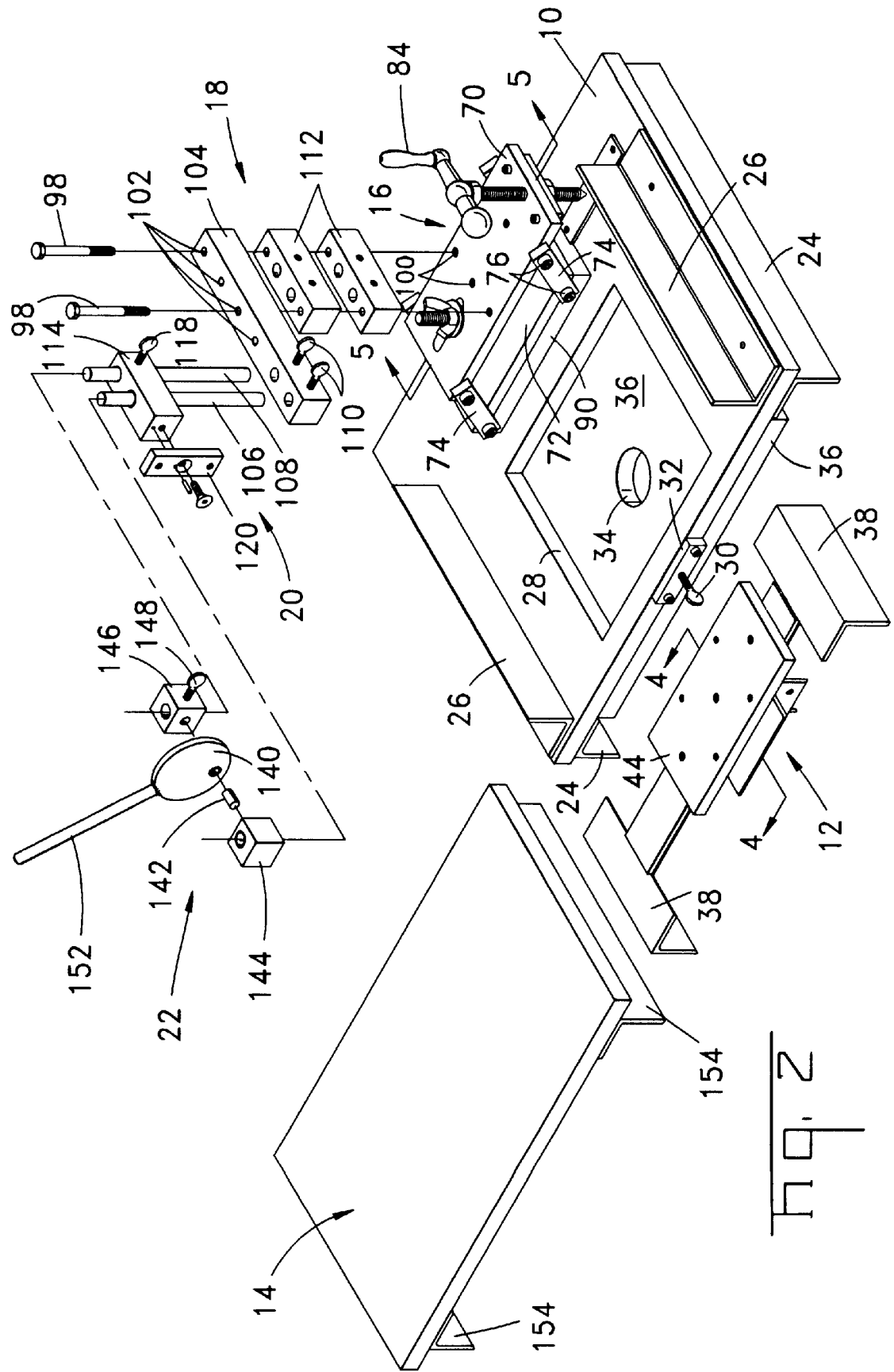
Figure 16:
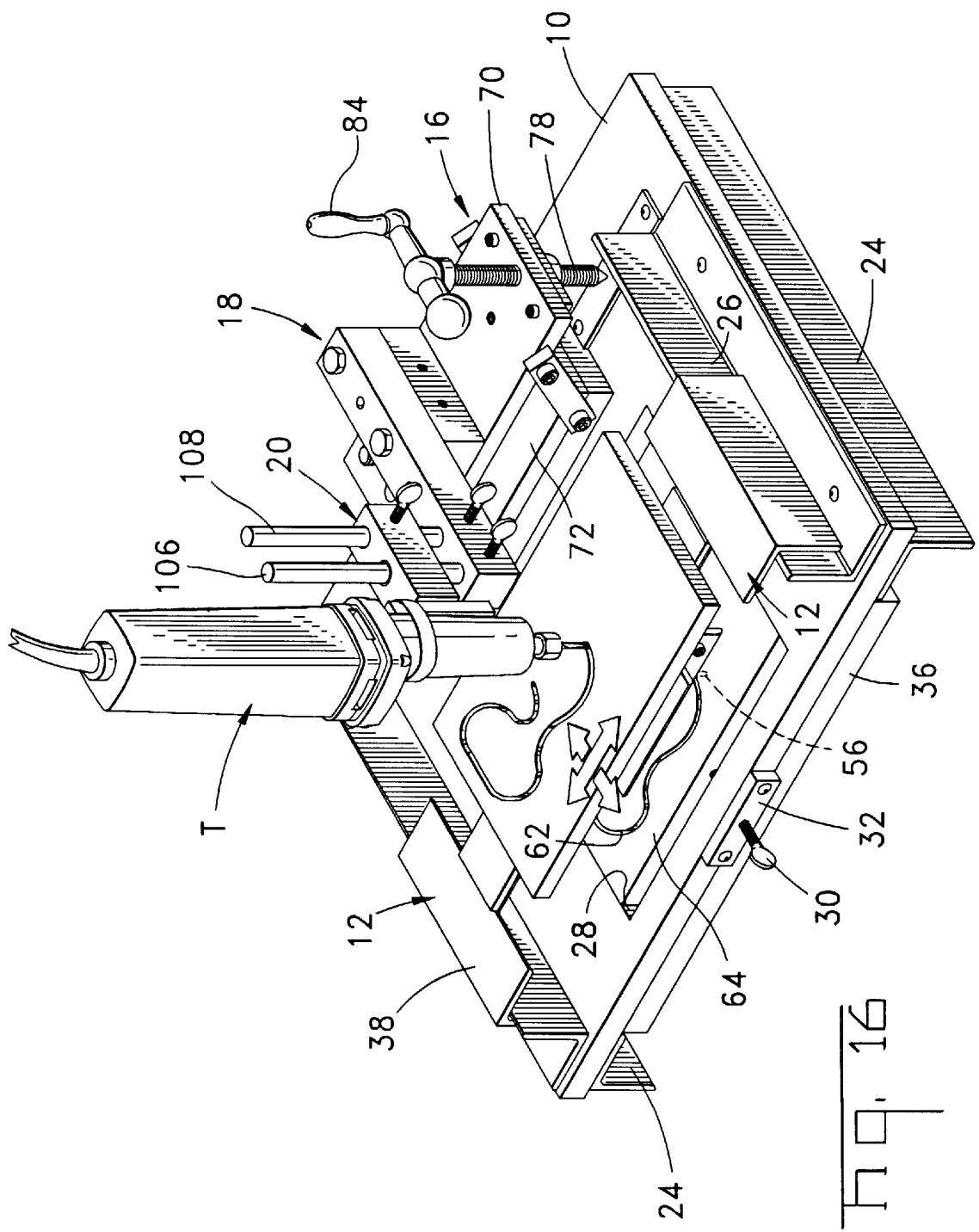

Referring to FIG. 2, the machine comprises a base plate 10, an X-Y table assembly 12, a stationary or Y-only table 14, an elevator mechanism 16, a modular over-arm assembly 18, movable tooling holders 20 and a mechanism 22 for drill press motion Base 10 has a pair of angle iron feet 24 on its underside to support the machine and to provide clearance for fasteners. A pair of Y axis runners 26 are affixed to base 10 on the top side to support and guide the tables 12 and 14. A template receiving cavity 18 is located toward the front of base 10 and centrally under the traveling area of the X-Y table 12. A thumbscrew 30 is threaded into a flat plate 32 which is secured to the front edge of base 10. Screw 30 communicates with the template cavity 28 to securely lock a template in place (FIG. 16).

A hole 34 is provided in a template support plate 36 which is attached to the underside of base 10 central to the cavity 28, for easy removal of templates from the cavity 28.

Figure 4A:
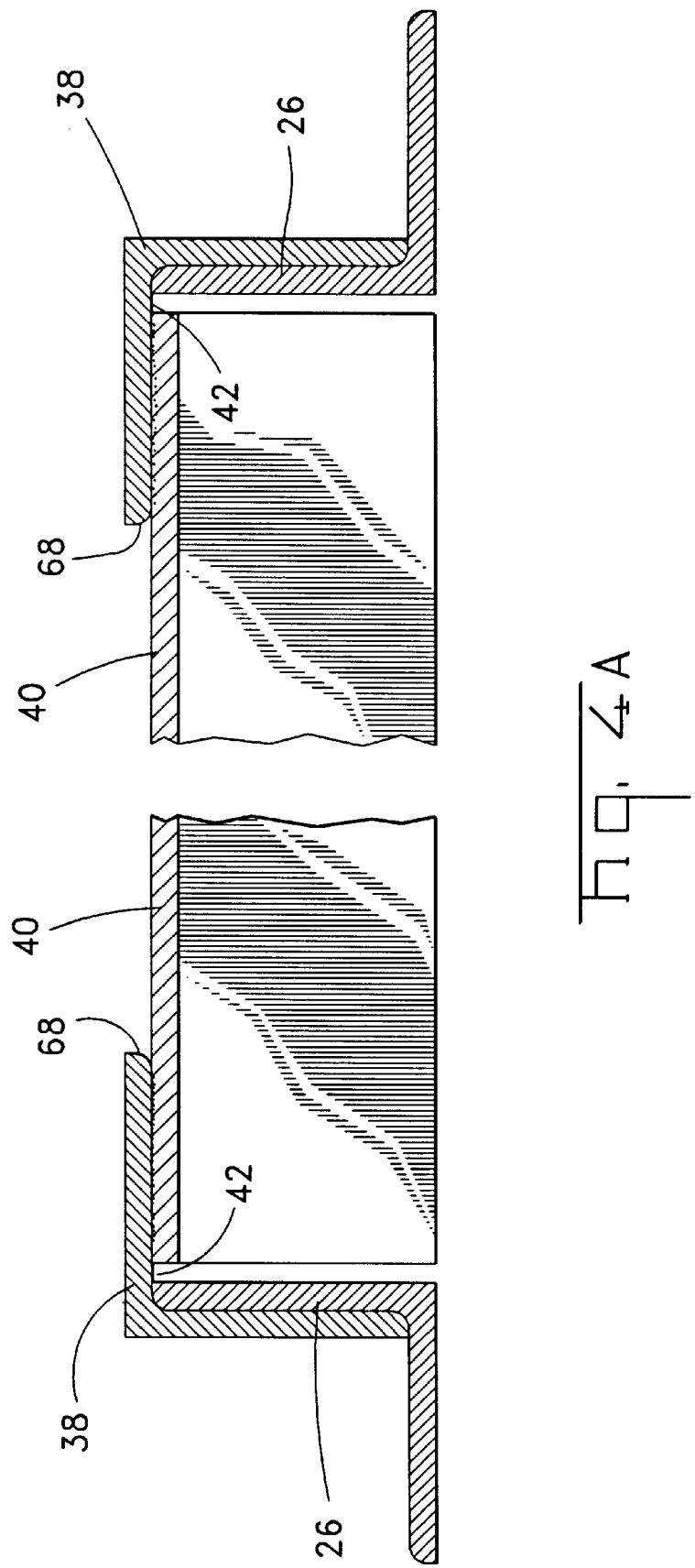
Figure 5:
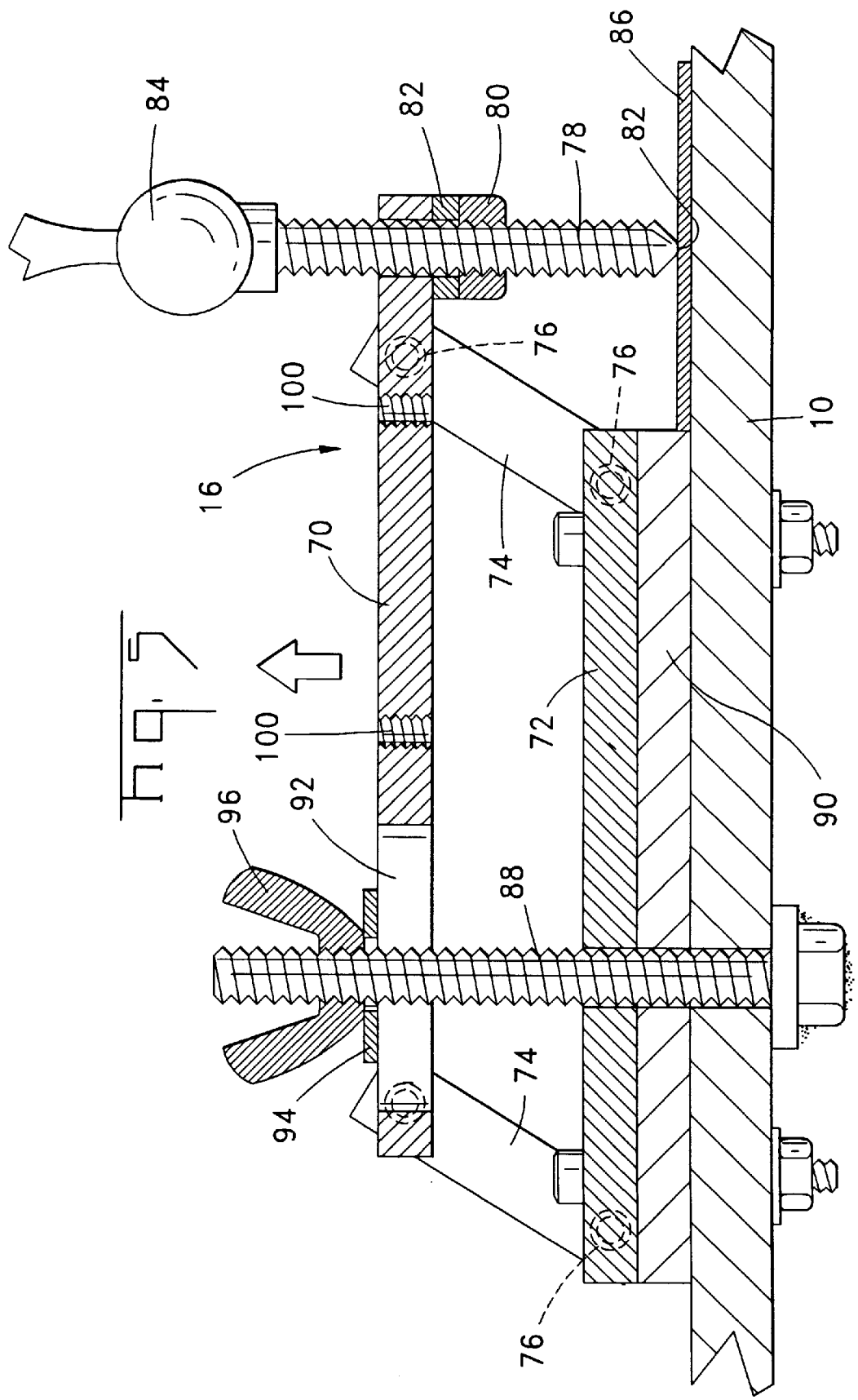

The X-Y table 12 is best shown in FIGS. 3 and 4. It comprises a pair of parallel angle iron pieces 38 welded to a right angle piece 40 to form an "H" shaped configuration Parallel end pieces 38 straddle the Y-axis runners 26 to provide guided motion in that axis. Member 40 is welded to end pieces 38 in a manner such as to leave an opening 42 between the ends of 40 and the inner walls of pieces 38. This can best be seen in FIG. 4A This is to facilitate the fit between the end pieces 38 and the Y-axis runners 26.

A table plate 44 has a pair of guide angle plates 46 and 48 adjustably fixed to its underside to guide it as it moves along the X axis astraddle member 40. Adjustment slots 50 are located in guide 48 to ensure a tight, sliding fit. Two screws 52 are provided on the lower apron 54 of guide 46 to stabilize the head against any rocking inclination as it moves along angle iron guide 40.

To make possible the pin routing function of this machine a spring loaded pin 56 is provided in a housing block 58 which is bolted to the apron 54 of guide 46. A spring 60 opposes upward movement of the pin 56 to urge it into a slot 62 in a template 64 (see FIG. 16) to guide the motion of the X-Y table to produce a similar pattern in the work piece above. A nylon spacer 66 is provided between the X-Y table plate 44 and the guide 40 to prevent the plate's X travel from being limited by its edge striking the upper lip 68 of end piece 38. The ends of plate 44 travel over and beyond the lip 68 until the guides 46 and 48 bottom against the lip thus giving maximum travel to the table 44.

Advantages of this X-Y mechanism over a linear ball bearing type are: it is inexpensive, adjustable, easily removed and can be moved easily in one axis at a time without the need of lead screws. The table has just enough friction to require a deliberate effort to move it in either axis so it does not tend to "drift" in one axis while you are moving in the other axis. This makes possible milling type operations on wood or soft metal.

Figure 11:
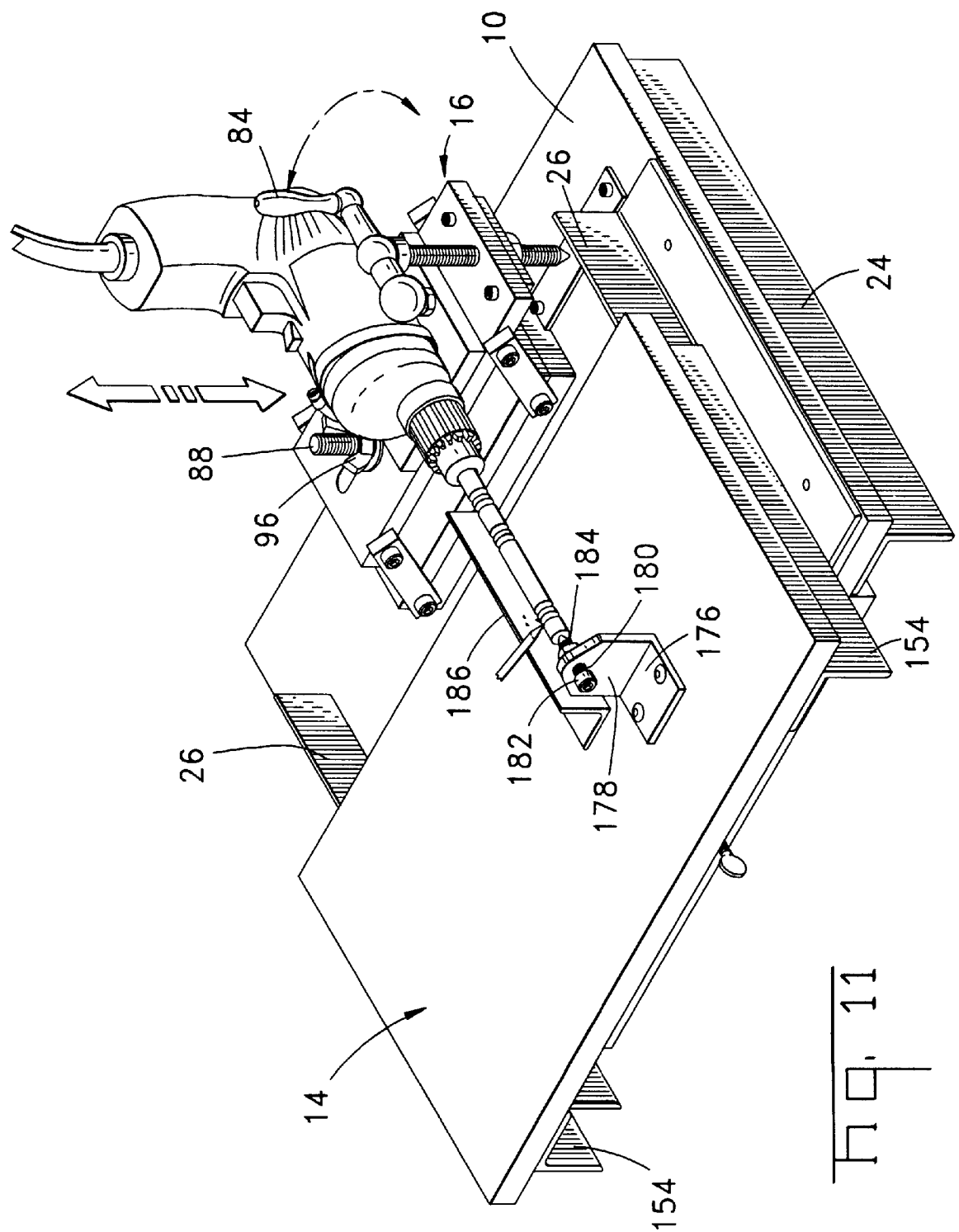
Figure 17:
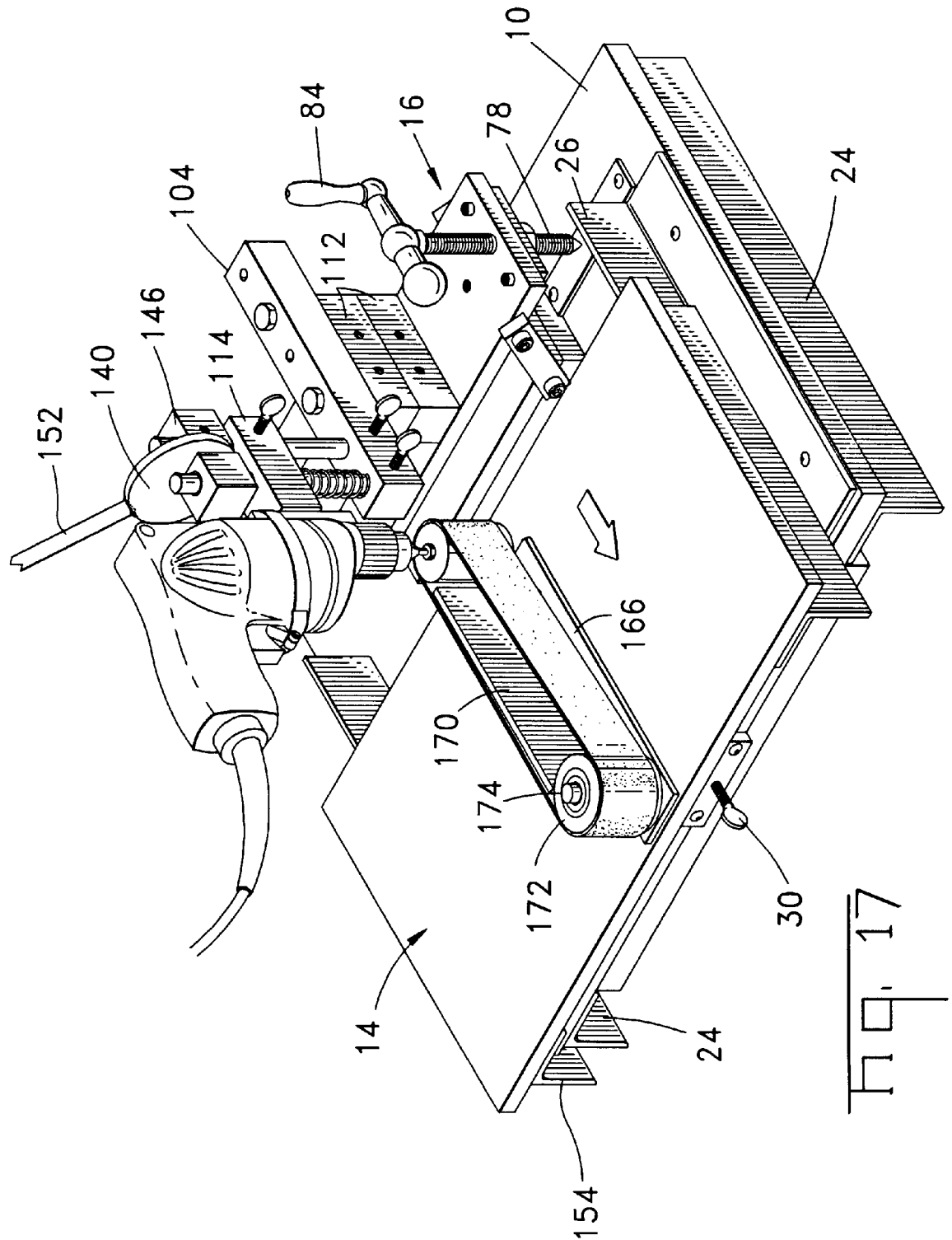

An auxiliary table 14 (FIG. 2) is provided when an X-axis movement is not desired. Table 14 has a pair of angle iron runners 154 which mate with Y-axis runners 26 on base 10. The table can move thereby in the Y-axis only which is needed when the machine is being used as a horizontal boring machine (FIG. 9), a lathe (FIG. 11) or a belt sander (FIG. 17). The table can be slid to its desired location (length of wood in lathe or to tighten the sanding belt) and then locked in place with a C-clamp or the like. In the case of the boring machine or a cut-off saw (not shown) the table is not locked as it must move to accomplish the work.

Figure 10:
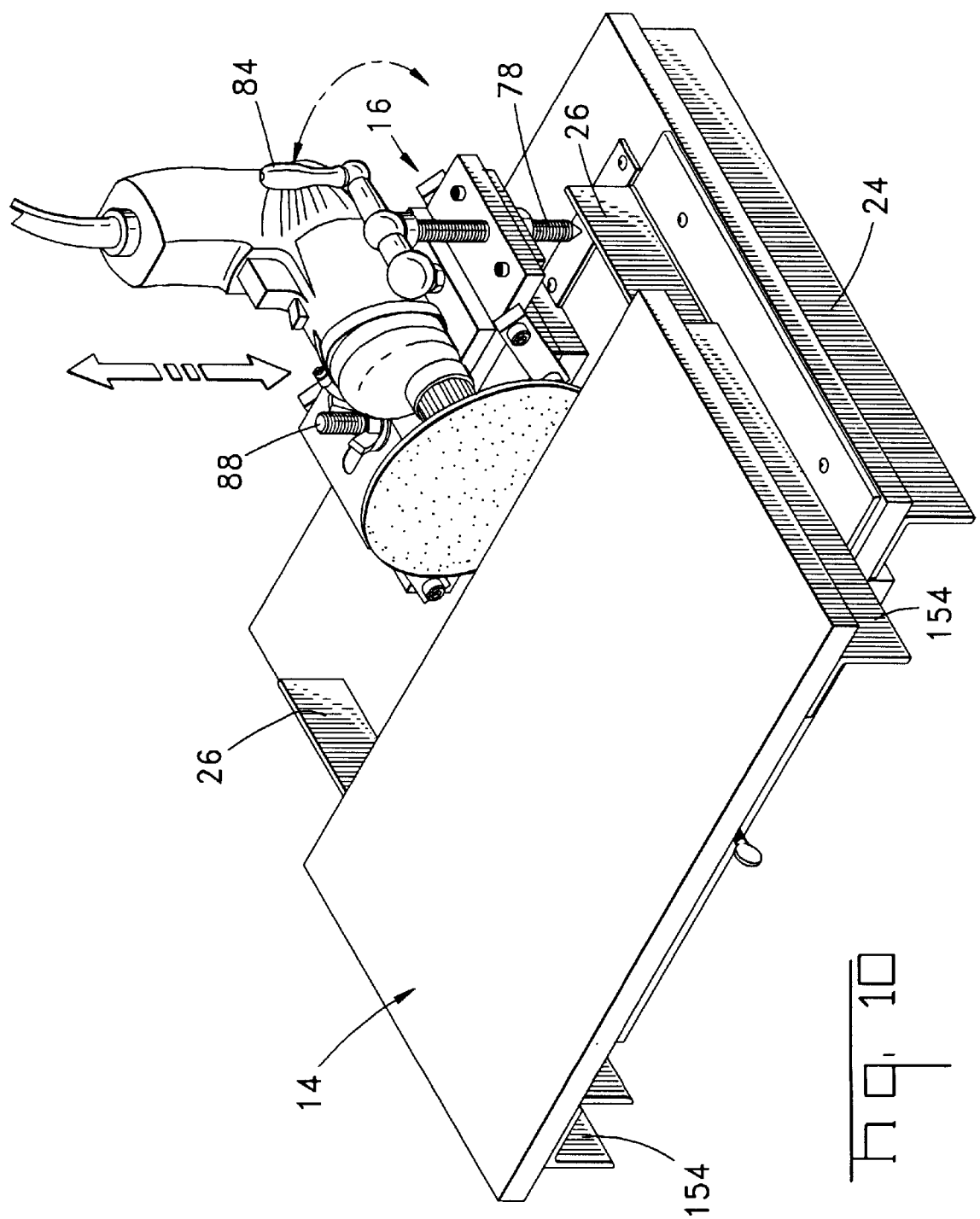
Figure 12:
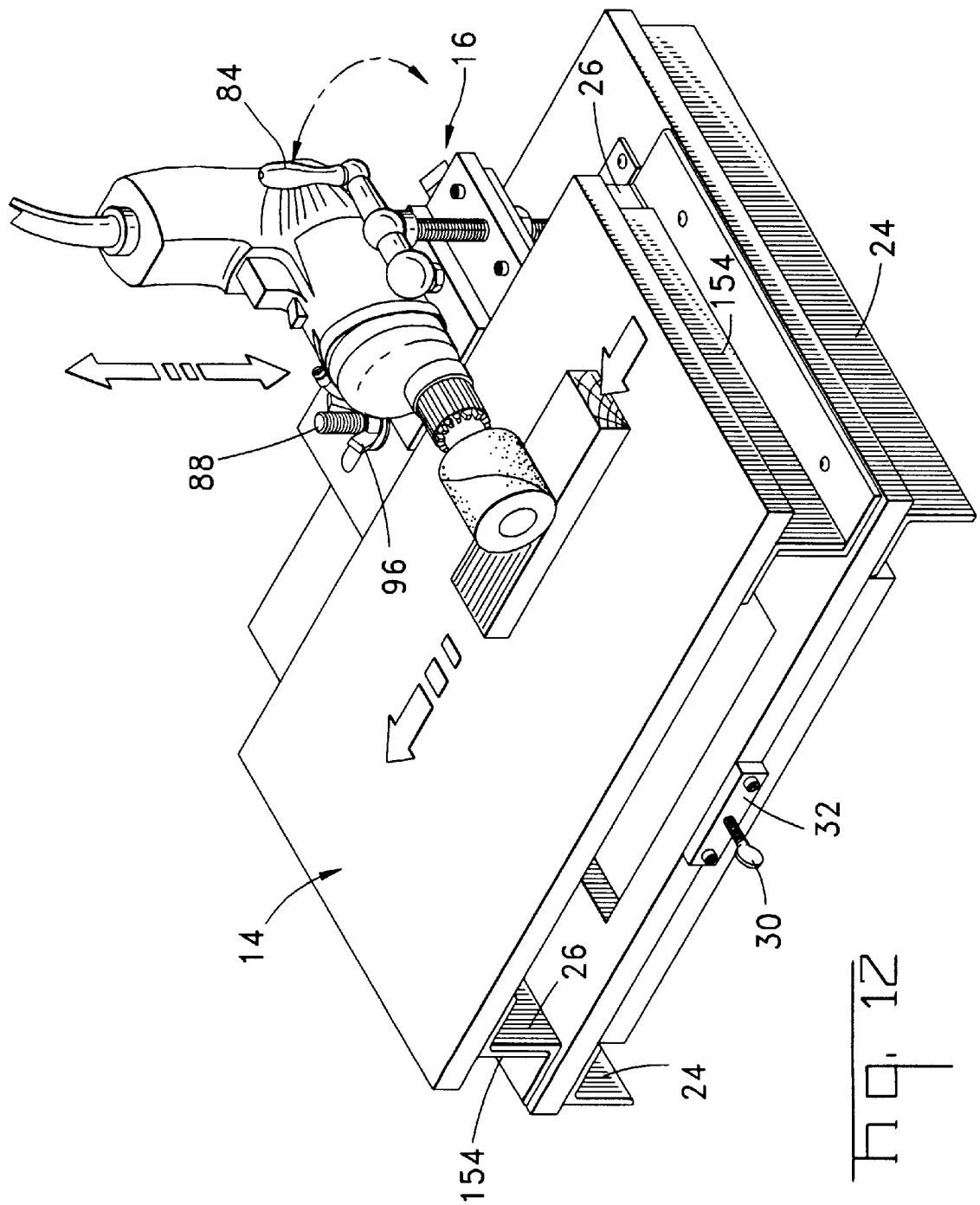
Figure 13:
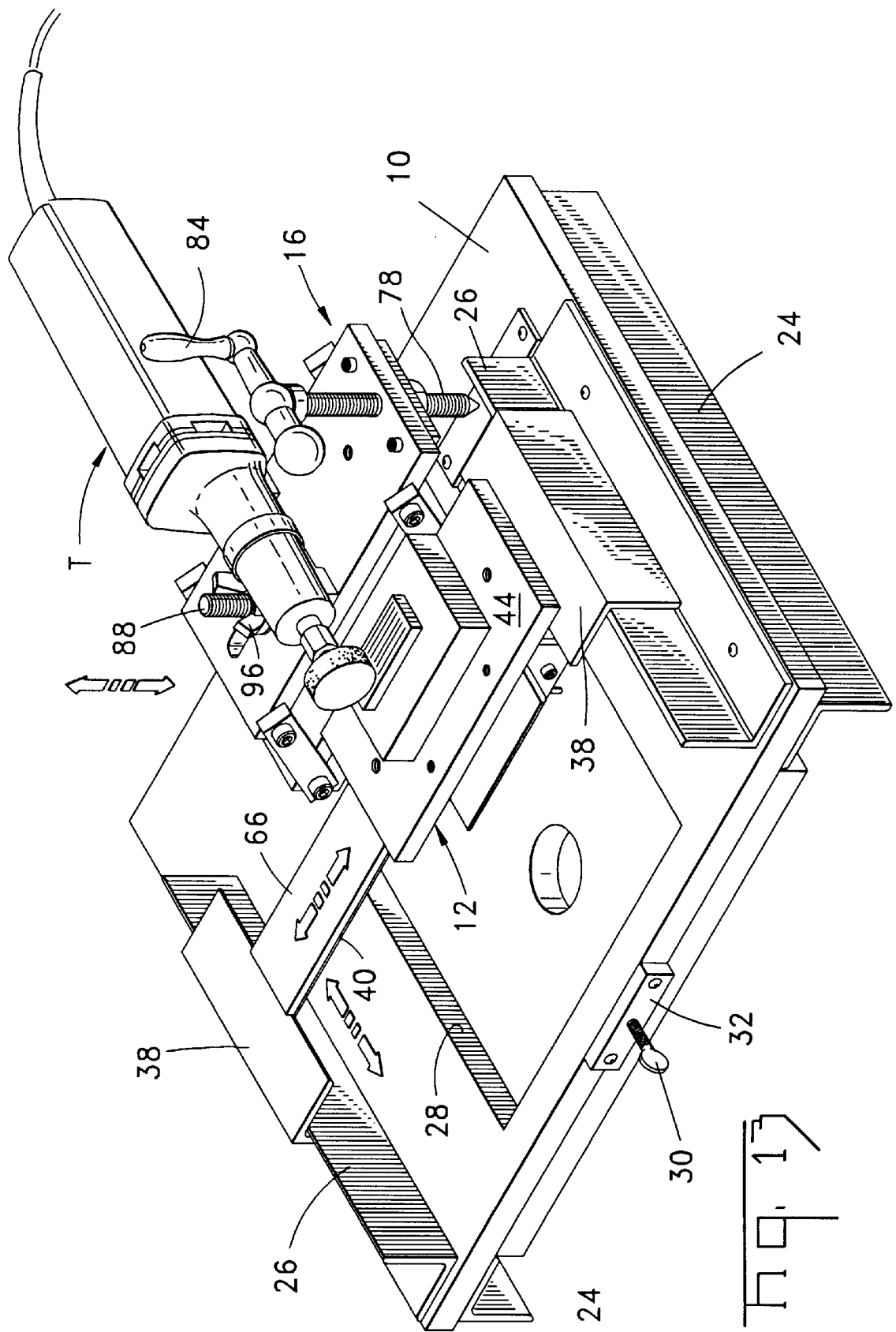
Figure 15:
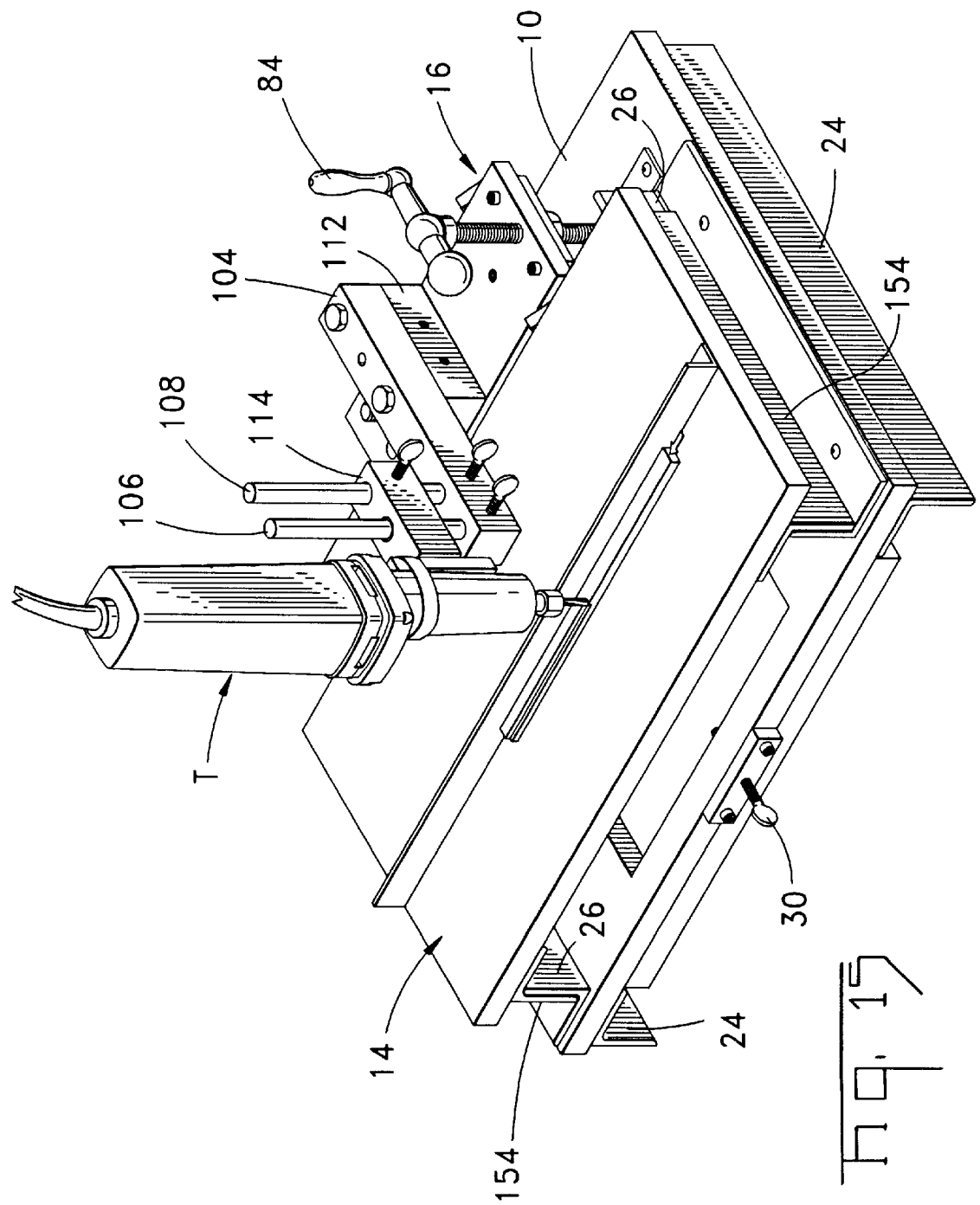

For other applications such as the thickness planer/sander (FIG. 12) drill press, (FIG. 18) disk sander (FIG. 10) shaper (FIG. 15) and scroll saw (FIG. 19) table 14 does not move. It is locked in a stationary position with a C-clamp or the like.

Figure 1:
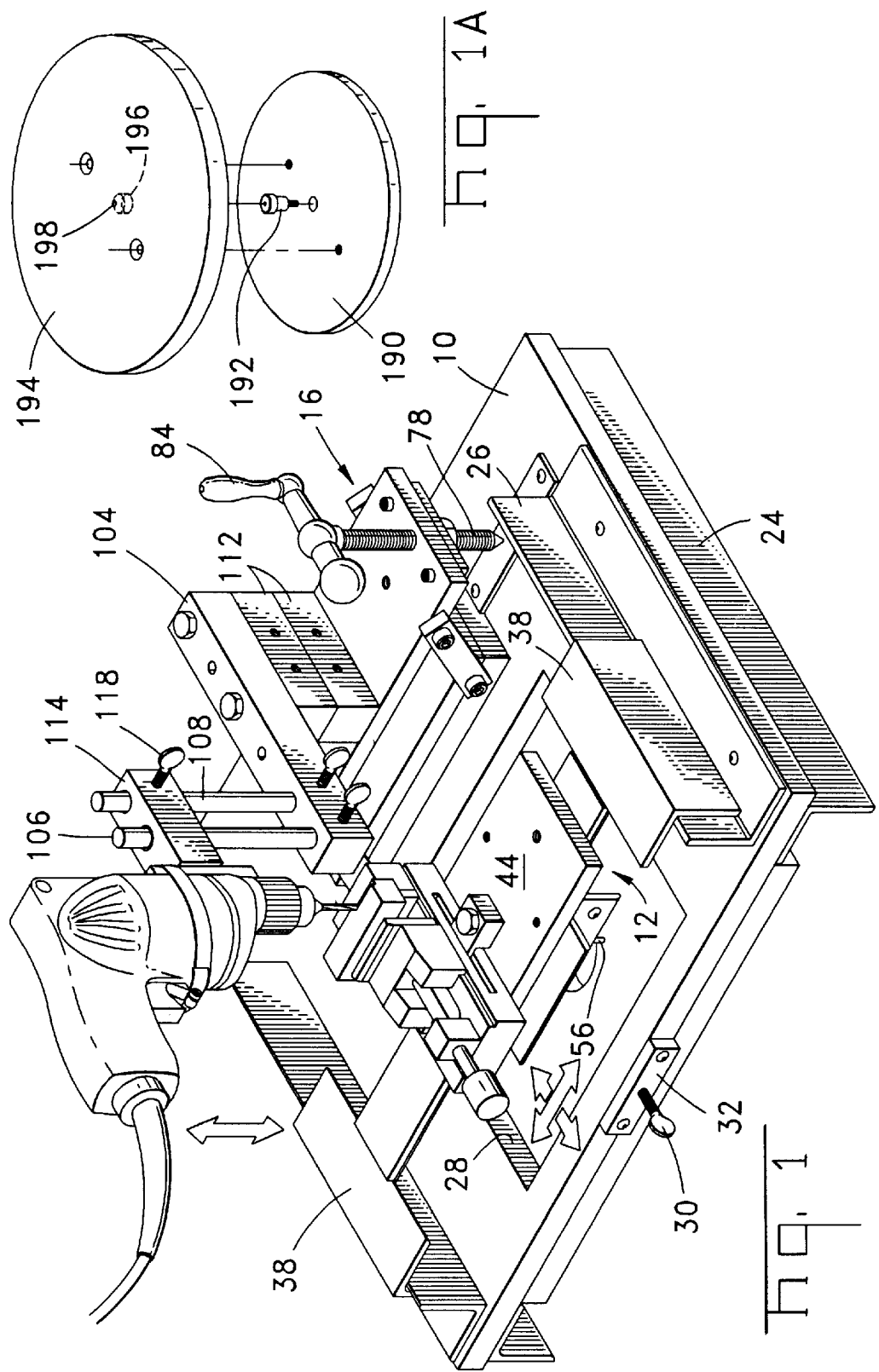
FIG. 1 Is an isometric drawing showing the machine of this disclosure set up as a milling machine, FIG. 1A Shows a rotary table to be used with the milling machine, FIG. 2 Is an isometric exploded drawing of most of the basic components of this machine, FIG. 3 Is a 3D exploded drawing of the X-Y table mechanism, FIG. 4 Is a cross-sectional view taken along the lines 4—4 of FIG. 2 and shows the construction of the head of the X-Y mechanism, FIG. 4A Is a fragmentary sectional view showing the weldment of the X-Y frame, FIG. 5 Is a cross-sectional view taken along the lines 5—5 of FIG. 2 and shows the Z axis or elevator mechanism, FIG. 6 Is a view similar to FIG. 5 but showing the mechanism in a lower position, FIG. 7 Is a 3D view illustrating how a tool is mounted directly to the elevator mechanism or to a secondary plate which is used when it is necessary to place the tool on an angle as when it is being used as a cylindrical grinder, FIG. 8 Is a fragmentary cross-sectional view showing how a tool is mounted to a sliding member located on the over-arm assembly, FIG. 9 Shows the machine set up as a horizontal boring machine, FIG. 10 Shows the set-up for a disk sander, FIG. 11 Shows the set-up for a wood lathe, FIG. 12 Shows the machine being used as a thickness planer/sander for wood, FIG. 13 Shows the machine functioning as a surface grinder for metal work, FIG. 14 Shows the machine being used a cylindrical grinder, FIG. 15 Shows the machine with its over-arm assembly and set up as a shaper, FIG. 16 Shows the machine functioning as a pin router, FIG. 17 Shows the machine functioning as an edge belt sander, FIG. 18 Shows the machine as a drill press, FIG. 19 Shows the set-up for a scroll saw, overhead router or rotary rasp or filing machine, FIG. 20 Shows the set-up for using the machine as a tapping guide, FIG. 21 Shows the machine with a standard heat gun mounted to perform plastic heat shaping and vacuum forming of small parts, FIG. 22 Shows the additional parts needed to make a belt sander, FIG. 23 Shows the additional parts needed to make a lathe, FIG. 24 Is an isometric drawing illustrating the preferred embodiment of the invention set up for X-Y table movement, FIG. 25 Is an exploded isometric drawing showing the construction of the frame and X-Y table of FIG. 24, FIG. 26 Is an isometric drawing showing the machine set up as an angle and surface grinder, FIG. 27 Is an isometric drawing showing the machine set up as a cross-cut saw, FIG. 28 Is a cross-sectional view taken along the lines 28—28 of FIG. 26, FIG. 29 Is a cross-sectional view taken along the lines 29—29 of FIG. 26 and FIG. 30 Is a cross-sectional view taken along the lines 30—30 of FIG. 26.

The elevator mechanism 16 comprises an upper plate 70 and a lower plate 72 connected in parallelogram fashion by 4 links 74 and shoulder bolts 76. Upper plate 70 is slightly longer than lower plate 72 to provide space for a table raising screw 78 which can be threaded through plate 70 if it is made of steel or can be threaded through a nut 80 welded on a plate 82 which is attached to plate 70 if the plate is made of aluminum or something softer. The screw 78 has a soft conical point 82 on its lower end and a turning handle 84 on its upper end. Point 82 rides on and along a metal bearing plate 86 mounted on base 10. As the screw is turned CW plate 70 is moved upwardly in an arcuate path defined by the links 74 and remains parallel to plate 72 and base 10. A second screw 88 is securely anchored to the underside of base 10 and passes upwardly through a spacer 90, lower plate 72 and through an elongated slot 92 in plate 70. A washer 94 and wing nut 96 are provided at the free end of screw 88 to lock the elevator 16 solidly and to move the plate 70 downwardly when it is tightened as screw 78 is loosened by CCW motion This mechanism supplies the up and down positioning of the tooling for the operations of thickness planer, surface grinder, cylindrical grinder, disk sander, lathe and horizontal boring machine. It also is the base to which the over-arm members are attached via bolts 98 (FIG. 2) to threaded holes 100 in plate 70. The four mounting holes are on centers common to the clearance holes 102 on the over-arm assemblies. This permits the over-arm 104 to be mounted in two different positions on plate 70. (See FIG. 1 and FIG. 17.) A pair of tool mounting rods 106 and 108 are held in over-arm 104 by a pair of thumbscrews 110. The positioning of the over-arm 104 on plate 70 provides two different locations for the rods 106 and 108. A third position is also possible by eliminating over-arm 104 and mounting rods 106 and 108 in the top spacer block 112. See FIG. 21. Spacer blocks 112 may be added as needed to reach the desired height of the over-arm A sliding tool holder 114 rides on rod 106 with a sleeve bearing 116 (FIG. 8) and on rod 108 through an oversized hole to eliminate alignment problems. Holder 114 is locked in position on rods 106 and 108 by a thumbscrew 118 against rod 108. Thus, rod 106 guides the sliding block 114, and rod 108 prevents it from rotating on rod 106 and also provides locking means.

A tool holding plate 120 is attached to the end of slider 114 by a countersunk screw 122 and a spring pin 124 to ensure against unwanted rotation of plate 120. A pair of tapped holes 126 in the top and bottom of plate 120 receive a pair of adjusting screws 128 to align the tool "T" perpendicularly to the machine. The tool is held to plate 120 by a standard hose clamp 130. Any hand tool such as a drill, hand grinder, moto-tool, heat gun and etc. can be mounted on plate 120 by using an appropriately sized hose clamp.

Each hand tool the user desires to mount should have its own tool holder comprised of a slider block 114 with plate 120 attached and a hose clamp. The tool can still be used manually with its mounting means attached and can be mounted to the machine in seconds for precision work.

Figure 14:
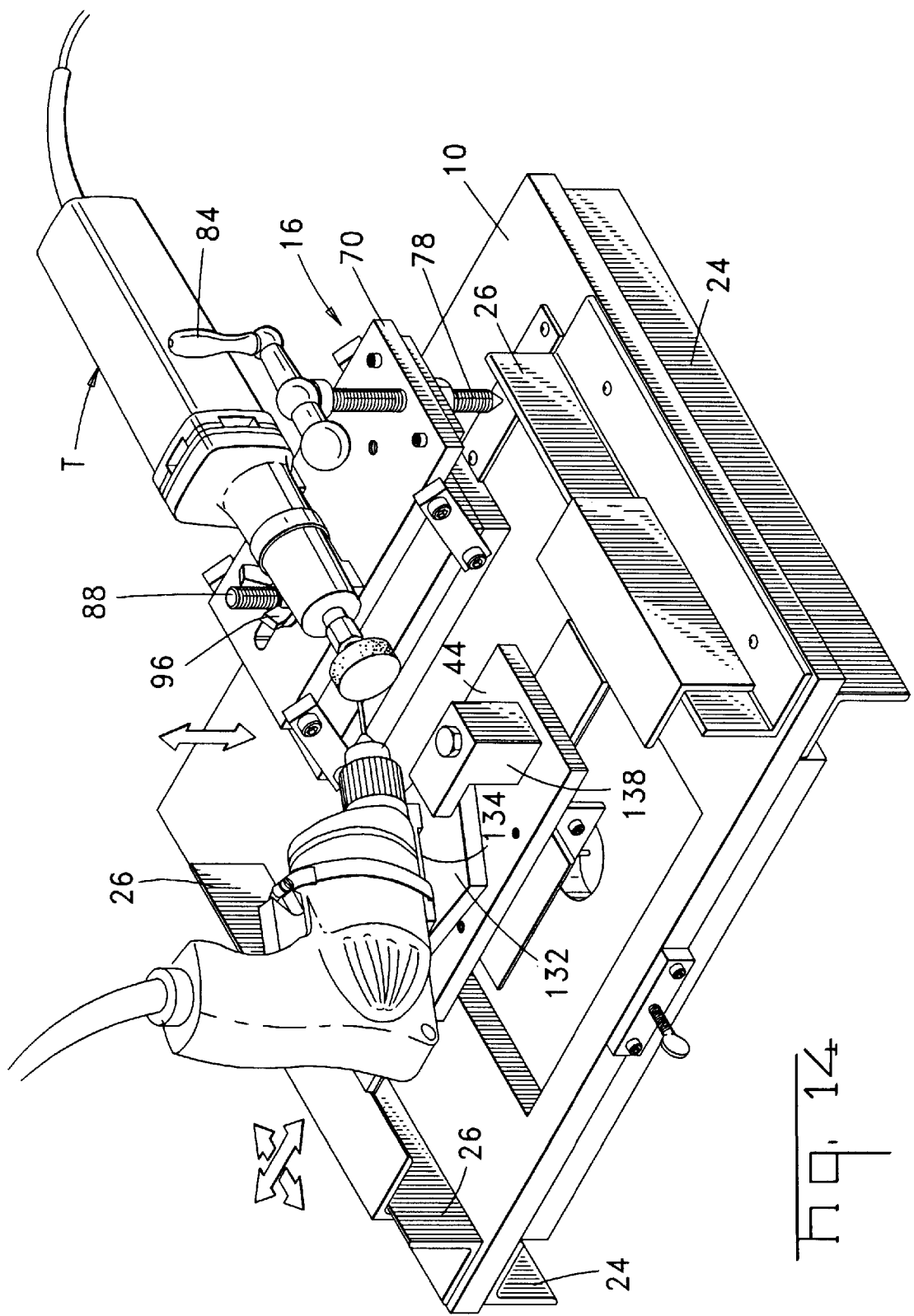

FIG. 7 shows a hand grinder being mounted to a plate 132 by being hose clamped to a bar 134 having a centrally located milled out area 136 to provide space for the hose clamp 130. Bar 134 is then bolted to plate 132 which is subsequently attached to either plate 70 of the elevator mechanism or to plate 44 of the X-Y table. FIG. 14 shows a hand drill attached to plate 132 which in turn is mounted on plate 44. In this case, only one screw is holding 132 to 44 so it can be rotated to a desired angle relative to the grinder mounted on the elevator 16. Plate 132 is then held in position by a finger block 138. If straight grinding is desired, two screws mount 132 to the plate 44. Bar 134 can also mount directly to the tapped holes in plate 70 or plate 44 for in-line mounting. As stated earlier all mounting holes are on the same center to center distance so all holders can be mounted in any position.

Any tool mounted on the over-arm rods 106 and 108 as previously described can be moved in the Z axis either by adjusting the elevator 16 or by sliding on the rods via slider block 114. This makes plunging very easy as in FIG. 19 where the machine is being used as a scroll saw (no need to drill holes in cut-out portions as is normally done). The tool is plunged through the wood and then locked on rod 108. The operator's hands then guide the wood to cut out the desired section. The tool is then raised, the wood moved to a new position and the process repeated.

The action is similar when the tool is being used as a shaper (FIG. 15), a pin router (FIG. 16) or as a free hand overhead router.

When the tool is being used as a drill press or milling machine it may be desirable to have a more controlled Z axis movement. This is provided by unit 22 (FIG. 2). An eccentric cam 140 is fixed for rotation on a pin 142 held between two blocks 144 and 146. Block 144 slides on rod 106 on a bearing similar to slider block 114 and block 146 rides on rod 108 and is lockable to it via thumbscrew 148.

Figure 18:
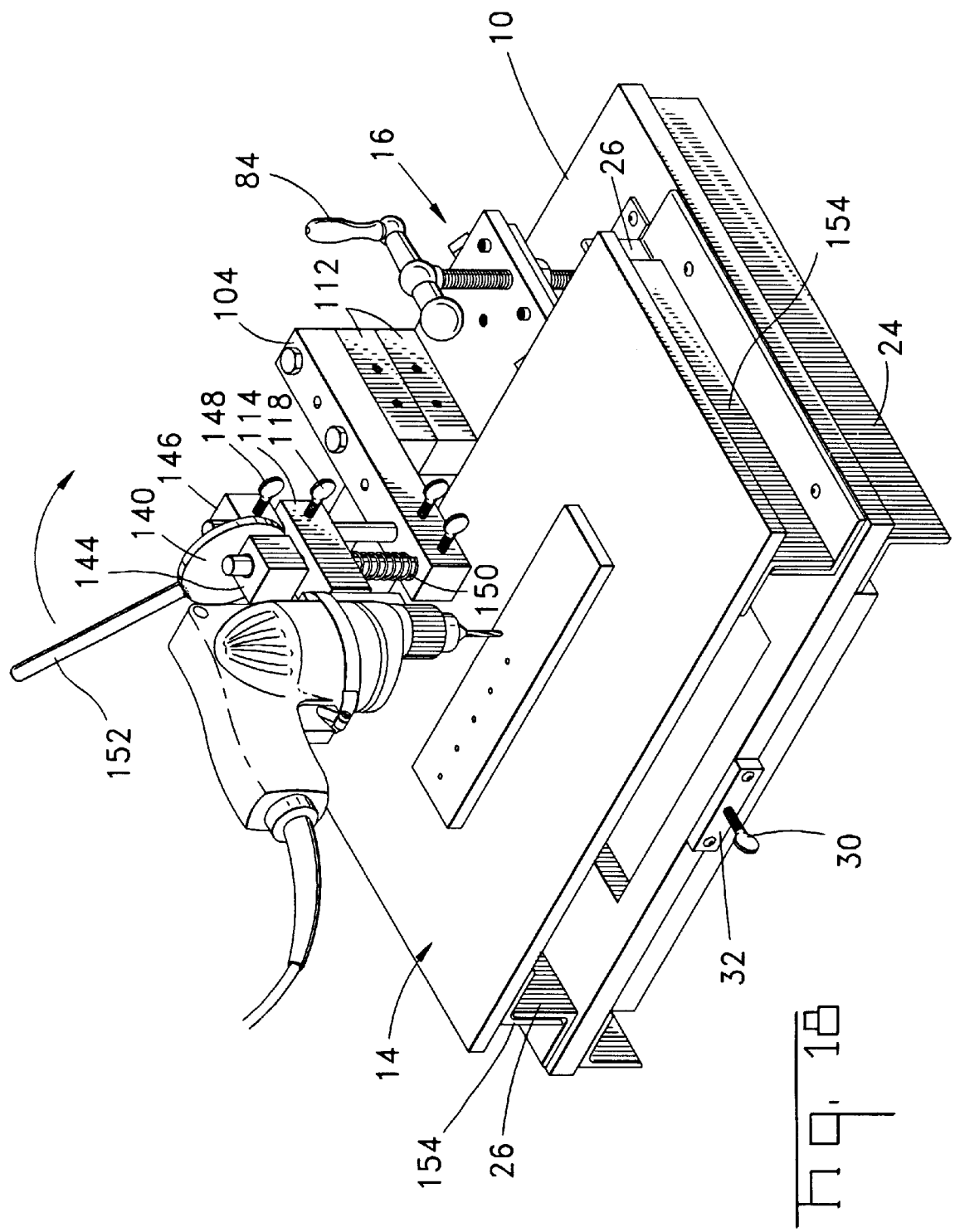
Figure 19:
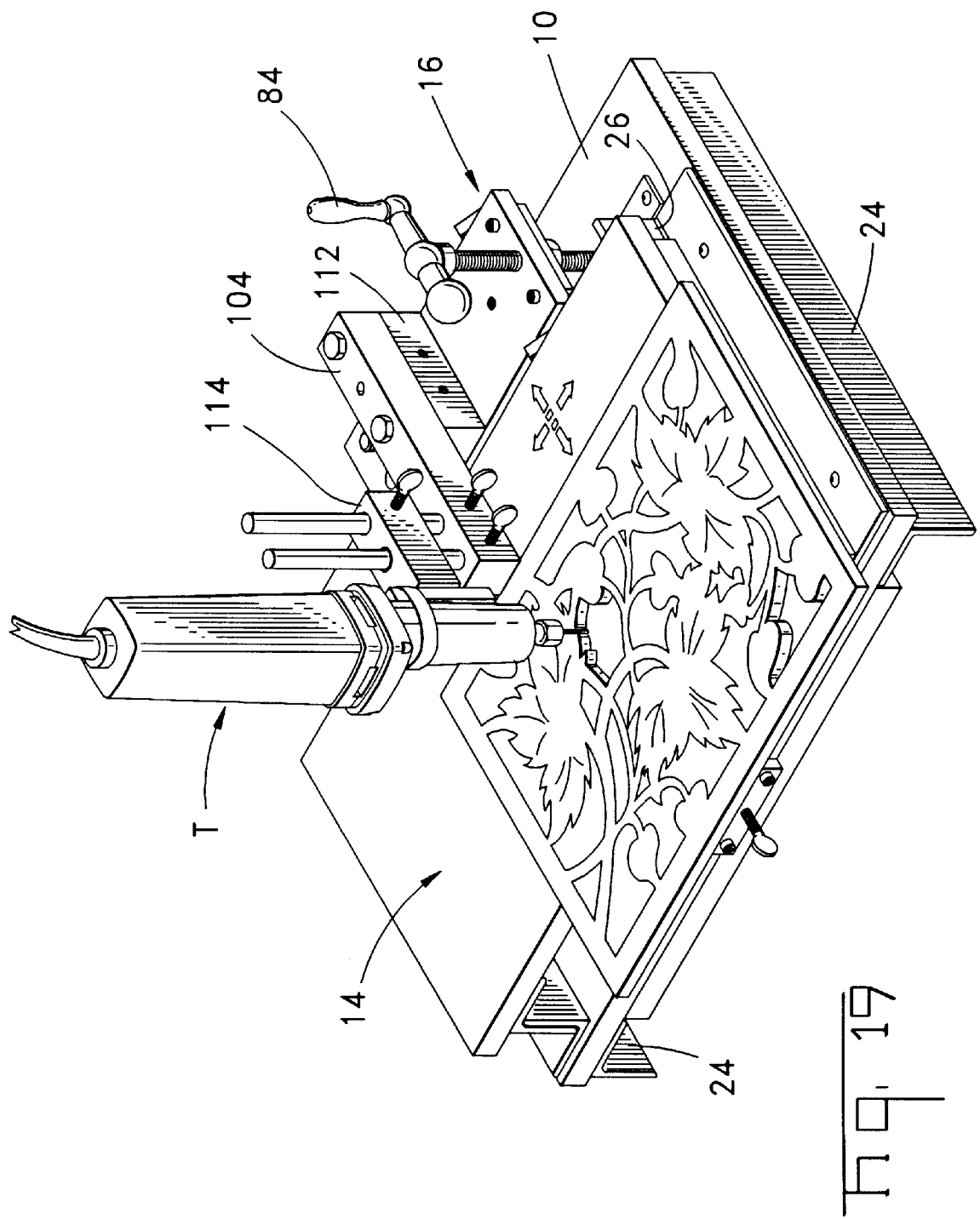

FIG. 18 shows this assembly in place on rods 106 and 108. A spring 150 is interposed between the over-arm 104 and slider block 114 on rod 106 to urge block 114 and its tool upwardly. A handle 152 is welded or otherwise attached to the cam 140. When the handle is rotated clockwise, the cam 140, as it rotates on pin 142, drives the slider block 114 and its attached tool, downwardly. The tool can be locked in any position by thumbscrew 118.

Figure 20:
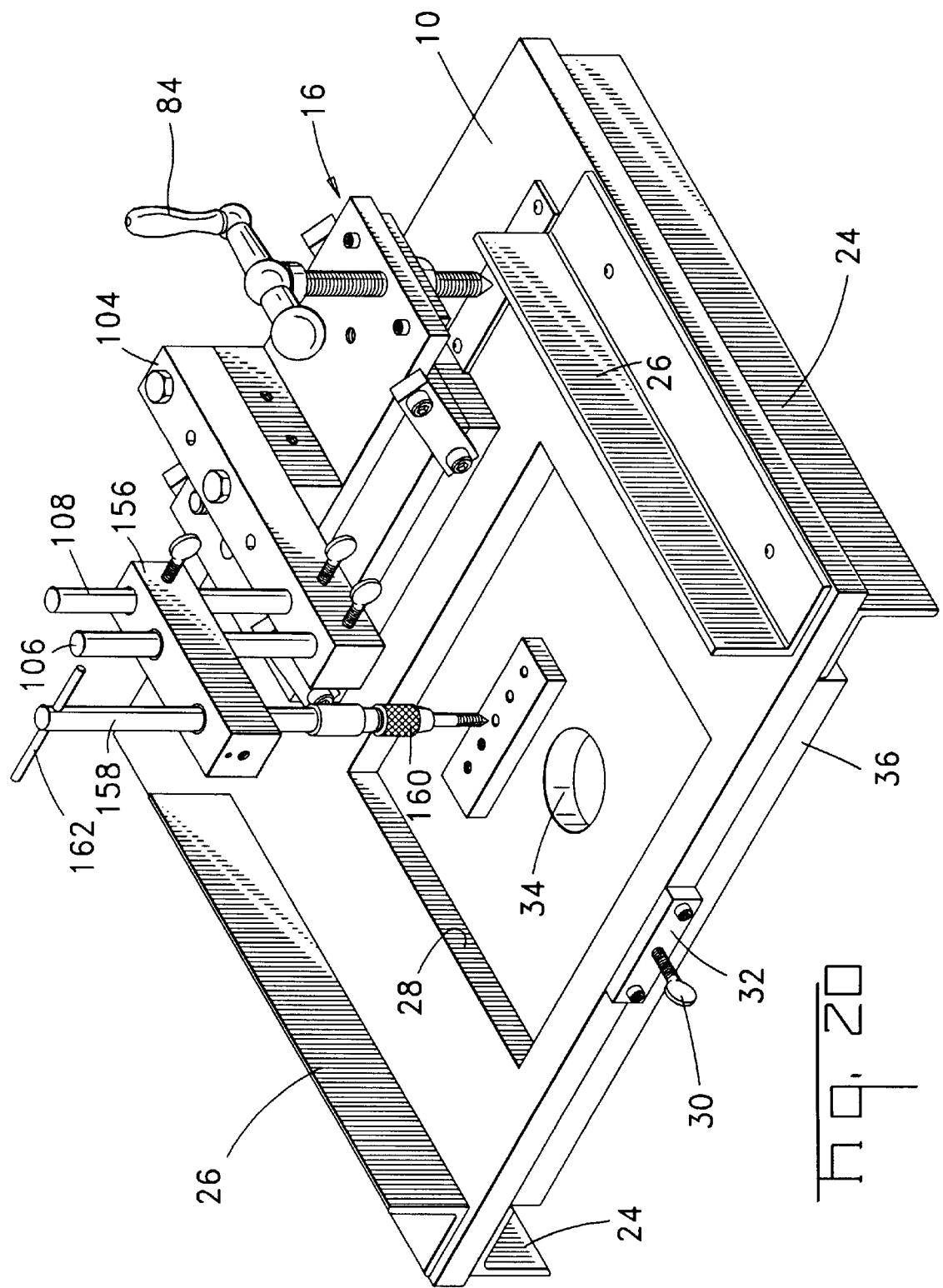

FIG. 1A shows a rotary table for use with the milling machine set-up. A metal disk 190 is fixed for rotation by a shoulder bolt 192 screwed into X-Y table 44. A wooden work table 194 is screwed to the disk 190 and is centered thereto by a recess 196 on its underside. Recess 196 fits over the head of bolt 192. A concentric hole 198 in the work table 194 provides visual tool alignment. With the disk 190 and work table 194 attached to X-Y table 44, the table 44 is moved till the upper tooling is in alignment with the center hole 198 of the worktable 194, the Y axis is locked with a C-clamp and the work piece is clamped, screwed, pinned or stuck to table 194 with its center point aligned with the tooling. Table 44 is then moved in the X axis the distance of the desired radius, then locked with a C-clamp and the tooling is plunged to the desired depth. The table 190, 194 is then manually rotated on shoulder bolt 192 to make a circular or arcuate cut FIG. 20 shows an additional use for this machine. A tapping guide block 156 is provided to be adjustably positioned on rods 106 and 108 in like manner of block 114. A rod 158 is slidably mounted in a sleeve bearing in block 156. A standard tap holder 160 is mounted on the lower end of rod 158 and a small rod 162 is inserted through a transverse hole in the other end of 158 for twisting action to turn the tap into the workpiece. To provide ample working space, in this mode, both tables 12 and 14 are removed.

Figure 21:
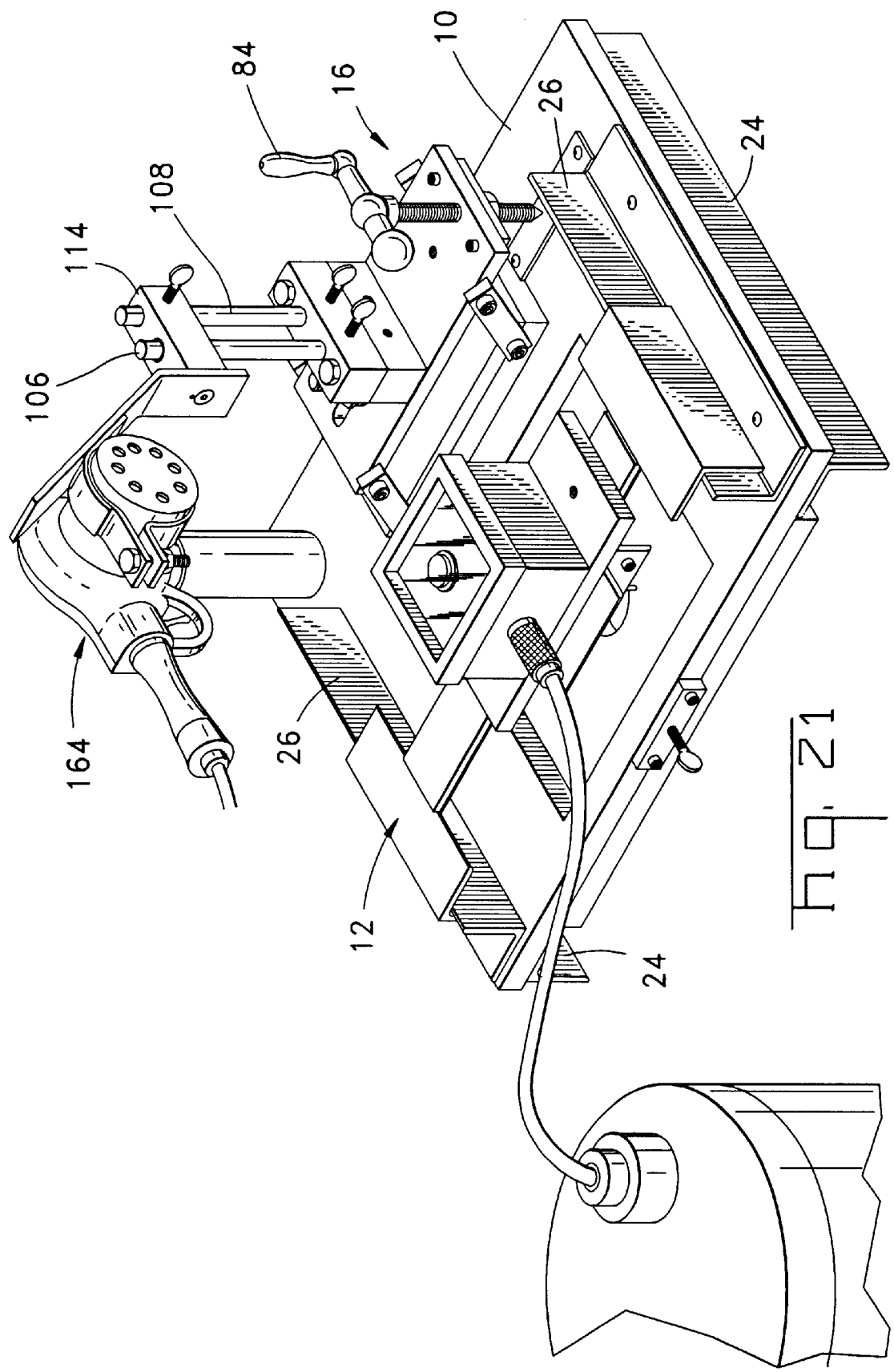

FIG. 21 shows the machine with a heat gun 164 mounted on a slider block 114. Since the heat gun is held firmly in a fixed position and the X-Y table can move under it and out from under it, a vacuum forming machine is possible. A standard shop vac can supply the vacuum as the plastic is being heated as the vacuum is pulled. This differs from other modeler's vacuum formers in that they heat the plastic in a home oven, pull it out and place it on the vacuum mechanism. The plastic is already cooling at this point and requires more vacuum. In the present disclosure the plastic is being heated directly on the vacuum former so that when the plastic reaches the optimum temperature the vacuum pulls it over the mold. The X-Y table is at this point pulled away from the heat gun The heat gun can also be used to heat thicker pieces of plastic or plexi-glass to a malleable temperature after which it can be pushed over a mold by a corresponding mold member to form most any shape.

FIG. 22 shows the additional parts needed to make an edge belt sander. A piece of angle iron 166 has a pair of elongated slots 168 on its base and the upstanding leg 170 is cut away on one end to provide clearance for a drum 172 which rotates via ball bearings on a shaft 174 welded to the base of 166. This unit is screwed fast to table 14 and a hand drill with a rubber sanding drum is attached to the over-arm assembly. A sanding belt is placed over the two drums (FIG. 17) and the table 14 is moved away from the drill until the sanding belt is properly tensioned. At this point table 14 is locked in position with a C-clamp. Tracking is accomplished by adjusting the two screws 128 in the tool mounting plate 120. In this position, without the belt unit, the machine functions as a vertical drum sander.

FIG. 23 shows the additional parts needed to make a lathe. A tail stock 176 is made of a piece of angle iron having two mounting holes by which it is mounted to table 14. The upstanding leg 178 has a drilled and tapped hole 180 which receives a screw 182 which has been ground to a point for holding the tail end of the wood to be turned. The other end is held either in the chuck's jaws if it is small enough, or by a spur center (not shown) which is held in the chuck jaws.

Elevator 16 must be adjusted to a height where the drill chuck and tail stock centers are aligned. The tail stock is then attached to table 14. Initial adjustment for wood length is made by moving table 14 in the Y-axis till the tail stock is in the proper location relative to the drill then locking table 14 via a c-clamp. Final adjustment to secure the workpiece is made by turning the screw 182 into the workpiece. The screw is then locked by turning the jam nut 184 against the tail stock. A tool rest 186 is screwed to table 14 approximate the workpiece and is adjustable via slotted holes 188.

As seen in FIGS. 24 and 25, the base 200 of the machine is an inverted sheet metal pan having a top supporting surface 202 and sidewalls 204 and 206 on which the base rests. Rubber edging strips (not shown) can be placed on the bottoms of walls 204 or 206 or both to provide a cushioned base to prevent damage to the kitchen table or other surfaces on which the machine may be used. A pair of angle iron runners 208 are adjustably screwed to base 200 via screws 210 to provide the guidance for the "Y" motion.

The "Y" motion table 212 is also an inverted sheet metal pan having sidewalls 214 which cooperate with runners 208 to guide the table and sidewalls 216 to which a handle 218 is mounted and 220 to which a guide member 222 is attached to provide the back guide for the "X" table 224. A GIB member 226 is secured to table 212 to provide the front guide for "X" table 224.

As seen in FIG. 28, table 224 is rabbitted out at 228 and guide 226 is stepped at 230 to cooperate with rabbit 228 to hold down and guide table 224. A pair of adjusting set screws 232 are provided in guide 226 to control the sliding motion of the table. The screws 232 bear against the top surface of table 212 to raise and lower guide 226 and a pair of screws 234 adjustably secure the guide 226 to table 212 via slots 236.

A set screw 238 (FIG. 30) is used to lock the "X" table 224 at any position Table 224 has a handle 240 on one end to facilitate movement of the table. A pair of thumb screws 242 are mounted on sidewalls 214 of table 212 to lock the table against "Y" motion. The screws 242 bear against the runners 208 to accomplish this. These screws may also be used to adjust the table for alignment and removal of undesired slop or play due to misalignment between the table 212 and runners 208.

When "Y" only movement is desired for uses such as a horizontal boring machine or cut-off saw, table 224 and guide 226 are removed and a plywood table 244 is attached to table 212 via countersunk screws 246.

Figure 27:
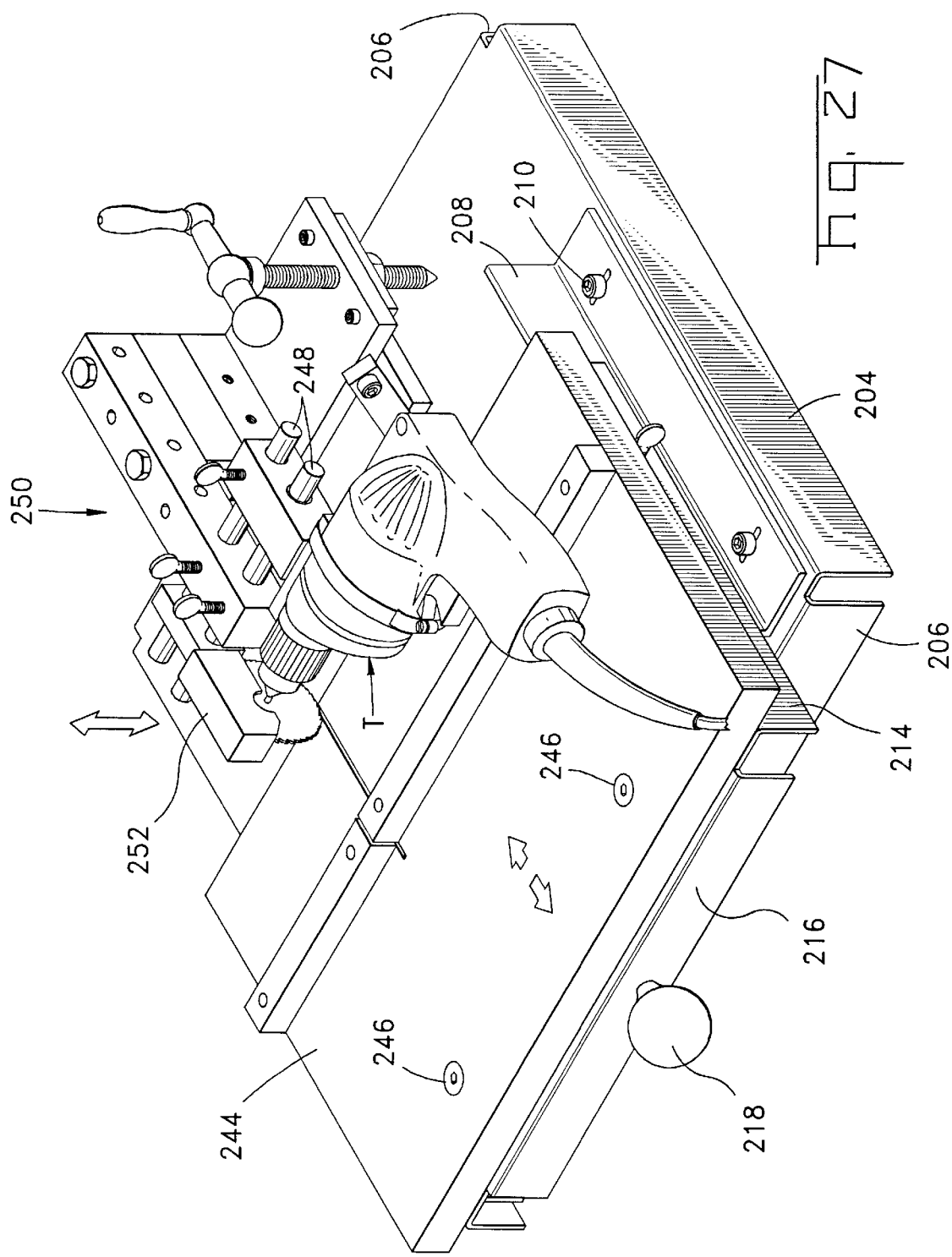

FIGS. 26 and 27 show the machine set up with the guide rods 248 of the modular over-arm assembly 250 turned to a horizontal position. This allows the tool "T" to be mounted in such a manner so as to be used as a cut-off saw, angle grinder, bench grinder, buffing wheel, wire wheel and etc.

The tool can be placed in many positions due to the fact that the guide rods 248 can have nine different positions to the right and nine more to the left. The rods 248 can also be positioned to extend out both sides of the overarm as shown in FIGS. 26 and 27. This allows the mounting of a blade guard 252 as shown and also allows the mounting of other devices such as an indexing mechanism (not shown) when the tool is used as a drill press in the vertical mode.

In FIG. 24, a vertical motion is applied to the tool "T" by a mechanism 254 mounted on the upper ends of rods 248. Movement of the handle 256 causes a rod 258 to pass through a block 260 and bear against the tool holder slide block 262 to force it downwardly. A spring 264 urges the block 262 upwardly as pressure is released. When a more precise movement is desired, a pressure device 266 (FIG. 25) is used. A block 268 is attached to the top of the rods 248 and a screw member 270 threaded in block 268 urges the tool sliding block 262 downwardly against the spring pressure of spring 264. This device would be used for example when the machine is set up as a milling machine.

As shown herein a powered hand tool having a rotary machining element, such as a drill bit, can be positioned in three perpendicular orientations. For example, FIGS. 1, 15, 16, 17, 18, 19,20, 24, and 25 show the tool support configured as a first tool holder means with the rotating machining element oriented in the Z direction for performing various machining operations on the workpiece. Alternatively, FIGS. 9, 10, 11, 12, and 13 show the tool support configured as a second tool holder means with the rotating machining element oriented in the Y direction for performing other machining operations on the workpiece. As a third alternative, the tool support can be configured as a third tool holder means as shown in FIGS. 26 and 27 where the rotating machining element is oriented in the X direction for performing still more machining operations on the workpiece.

Many representative uses for this machine have been documented herein, but because of its extreme versatility, other uses will be apparent to a user skilled in the art to facilitate his own personal needs as they arise.

I claim:

1. An apparatus for use in preforming machining operations on a workpiece, the apparatus comprising:
   a base;
   a first table mounted on the base and movable relative to the base along a Y axis, the first table including a first surface for mounting the workpiece thereon;
   a second table removably mounted on the first table and movable relative to the first table and the base along an X axis, the second table including a second surface for mounting a workpiece thereon;
   one of a pluality of powered hand tools;
   a tool support mounted on the base and including means for mounting the one of a plurality of powered hand tools above the first and second tables, the first and second tables being movable relative to the tool support and relative to the one hand tool mounted on the tool support so that the workpiece can be moved relative to the hand tool mounted on the tool support to machine the workpiece; and
   at least one first runner extending parallel to the Y axis on a top surface of the base and at least one second runner extending parallel to the Y axis on a bottom surface of the first table, the first and second runners being relatively laterally adjustable so that the first and second runners are slideably engagable.

2. The apparatus of claim 1 wherein movement of the first table in the direction of the Y axis moves the second table in the direction of the Y axis.

3. The apparatus of claim 1 wherein the tool support is movable along a Z axis, perpendicular to the X and the Y axes.

4. The apparatus of claim 1 including means for locking at least one first runner to at least one second runner.

5. The apparatus of claim 1 including first and second spaced guide members extending parallel to the X axis on a top surface of the first table, the second table being positioned between the guide members.

6. The apparatus of claim 1 wherein the runners comprise segments of angle iron.

7. The apparatus of claim 1 wherein the X and Y axes are in a horizontal plane.

8. An apparatus for use in performing machining operations on a workpiece, the apparatus comprising:
   a base;
   an x-y table mounted on the base and including means for mounting the workpiece thereon, the x-y table being capable of simultaneous movement in an x direction and in a perpendicular y direction relative to the base; and
   a tool support including at least one rod, the tool support being mounted on the base, the tool support also including a tool holder securing a tool to the at least one rod alternatively in a number of positions relative to the x-y table with the tool being held in position to machine the workpiece, the rod being alternatively securable in a first position extending perpendicular to the x-y table and in a second position extending parallel to the x-y table.

9. The apparatus of claim 8 wherein the tool holder is movable in a z direction perpendicular to the x-y table to move the tool in a z direction relative to the workpiece so that the workpiece can be moved in mutually perpendicular x, y, and z directions as the tool machines the workpiece.

10. The apparatus of claim 8 wherein the at least one rod is positioned over the x-y table.

11. The apparatus of claim 8 including a pair of rods and means for securing the tool holder to at least one of the rods in different positions.

12. The apparatus of claim 11 wherein the tool support includes a parallelogram linkage positioned between the rods and the base to change the elevation of the rods and of the tool mounted thereon.

13. The apparatus of claim 8 wherein the tool support includes an elevator means for changing the position of the tool in the Z direction, the elevator means comprising a plate, a table raising screw and a limit screw, the table raising screw threadably engaging the plate to raise the plate and the limit screw engaging the plate to limit the extent to which the plate can be raised, the table raising screw and the limit screw together securing the plate at one elevation to position the tool along the Z direction.

14. The apparatus of claim 8 wherein the tool support comprises means for securing a powered hand tool to the apparatus.

15. An apparatus for use in performing multiple machining operations on a single workpiece or on multiple workpieces, the apparatus comprising:
   table means for positioning the workpiece, the table means being movable in an X direction and in a perpendicular Y direction to move the workpiece positioned on the table in the X direction, in the Y direction, or simultaneously in the X and in the Y directions,
   a powered hand tool with a rotating machining member; and
   first tool holder means for positioning the powered hand tool with a rotating machining member extending in a Z direction, perpendicular to the X and Y directions, to alternatively perform machining operations on a workpiece, the machining operations being selected from the group consisting of shaping, pin routing, belt sanding, drilling, scroll sawing, overhead routing, rasping, and filing; and
   second tool holder means for alternatively positioning the powered hand tool with a rotating machining member extending in the Y direction to alternatively perform machining operations on a workpiece, the machining operations being selected from the group consisting of horizontal boring, disk sanding, lathing, planing and surface grinding.

16. The apparatus of claim 15 further comprising third tool holder means for alternatively positioning a powered hand tool with a rotating machining member extending in the X direction to alternatively perform machining operations on a workpiece, the machining operations being selected from the group consisting of surface grinding and cross cut sawing.

17. The apparatus of claim 15 wherein the table means includes a separate X table and Y table.

18. The apparatus of claim 17 wherein the X table is removably mounted on the Y table.

* * * * *